US010459162B2

(12) United States Patent
Iida et al.

(10) Patent No.: US 10,459,162 B2
(45) Date of Patent: Oct. 29, 2019

(54) SEMICONDUCTOR DEVICE

(71) Applicant: Renesas Electronics Corporation, Tokyo (JP)

(72) Inventors: Tetsuya Iida, Hitachinaka (JP); Yasutaka Nakashiba, Hitachinaka (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/036,455

(22) Filed: Jul. 16, 2018

(65) Prior Publication Data
US 2019/0072717 A1    Mar. 7, 2019

(30) Foreign Application Priority Data
Sep. 5, 2017  (JP) .................. 2017-170268

(51) Int. Cl.
*G02B 6/122*    (2006.01)
*G02B 6/125*    (2006.01)
*G02B 6/12*    (2006.01)

(52) U.S. Cl.
CPC ........... *G02B 6/1228* (2013.01); *G02B 6/125* (2013.01); *G02B 2006/12061* (2013.01); *G02B 2006/12119* (2013.01)

(58) Field of Classification Search
CPC .................. G02B 6/1228; G02B 6/125; G02B 2006/12119; G02B 2006/12061
See application file for complete search history.

(56) References Cited

U.S. PATENT DOCUMENTS 6,621,972 B2 *  9/2003  Kimerling et al. ...... G02B 6/12
                                                        385/129

FOREIGN PATENT DOCUMENTS

JP    2000-066048 A    3/2000
JP    2000-131547 A    5/2000

* cited by examiner

*Primary Examiner* — Ryan A Lepisto
(74) *Attorney, Agent, or Firm* — McGinn I.P. Law Group, PLLC.

(57) ABSTRACT

To provide a semiconductor device including a low-loss optical waveguide. The optical waveguide included in the semiconductor device has a core layer covered with first and second clad layers having respectively different refractive indices. A portion of the core layer is covered at a first ratio, that is, a ratio of the first clad layer to the second clad layer and at the same time, a second ratio, that is, a ratio of the second clad layer to the first clad layer. At this time, the first ratio and the second ratio are each a finite value more than 0.

19 Claims, 32 Drawing Sheets

Related Art

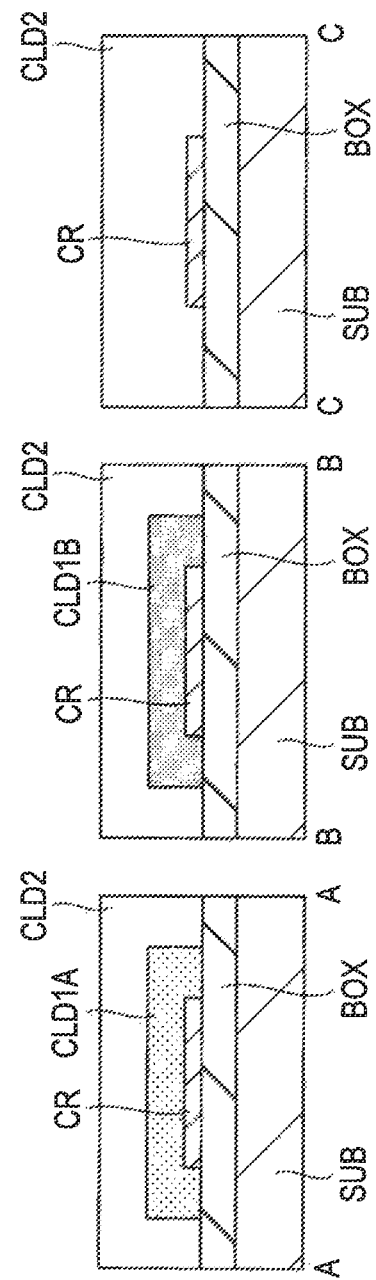

SEMICONDUCTOR DEVICE

CROSS-REFERENCE TO RELATED APPLICATIONS

The disclosure of Japanese Patent Application No. 2017-170268 filed on Sep. 5, 2017 including the specification, drawings, and abstract is incorporated herein by reference in its entirety.

BACKGROUND

The present invention relates to a semiconductor device, for example, a technique effective when applied to a semiconductor device including an optical waveguide formed using silicon photonics technology.

Japanese Unexamined Patent Application Publication No. 2000-66048 (Patent Document 1) describes a technique relating to a semiconductor device having a quartz-based optical waveguide having an optimum refractive index difference for each shape.

Japanese Unexamined Patent Application Publication No. 2000-131547 (Patent Document 2) describes a technique, in an optical waveguide having a curved waveguide and a linear waveguide, of controlling the refractive index of a core for making a refractive index difference between a core and a clad in the curved waveguide higher than a refractive index difference between a core and a clad in the linear waveguide.

PATENT DOCUMENTS

[Patent Document 1] Japanese Unexamined Patent Application Publication No. 2000-66048
[Patent Document 2] Japanese Unexamined Patent Application Publication No. 2000-131547

SUMMARY

In the silicon photonics technology, for example, a core layer of an optical waveguide is formed by processing a silicon layer of a SOI (silicon on insulator) substrate and a silicon oxide layer that covers this core layer is formed as a clad layer.

In the optical waveguide having such a configuration, the refractive index of the core layer is required to be made higher than that of the clad layer so as to satisfy the total reflection condition at the interface between the core layer and the clad layer.

In this point, when the core layer is comprised of a linear portion and a curved portion, the refractive index difference is preferably different depending on the shape of the core layer from the standpoint of reducing scattering loss, more specifically, the optimum refractive index difference between the core layer and the clad layer at the linear portion is preferably different from that between the core layer and the clad layer at the curved portion. To achieve this, formation of an optical waveguide different in refractive index between the clad layer that covers the core layer configuring the linear portion and the refractive index of the clad layer that covers the core layer configuring the curved portion can be considered as one measure. As a result of investigation, however, the present inventors have found newly that in the case where the refractive index of the clad layers that cover the core layer changes drastically in a direction of light propagating in the optical waveguide, optical loss is incurred due to scattering of light at the interface between the clad layers having respectively different refractive indices. This means that there is a room for improvement in achieving a low-loss optical waveguide having a core layer comprised of a linear portion and a curved portion.

The other problems and novel features will be apparent from the description herein and accompanying drawings.

An optical waveguide included in a semiconductor device of one embodiment has a core layer covered with a first clad layer and a second clad layer having respectively different refractive indices. A portion of the core layer is covered at a first ratio, that is, a ratio of the first clad layer to the second clad layer and at the same time, at a second ratio, that is, a ratio of the second clad layer to the first clad layer. The first ratio and the second ratio are each a finite value more than 0.

Above-described embodiment can provide a semiconductor device including an optical waveguide capable of propagating light therein with low optical loss.

BRIEF DESCRIPTION OF THE DRAWINGS

FIG. 34 is a cross-sectional view showing a manufacturing step of the semiconductor device following that of FIG. 33.

DETAILED DESCRIPTION

Figure 1:
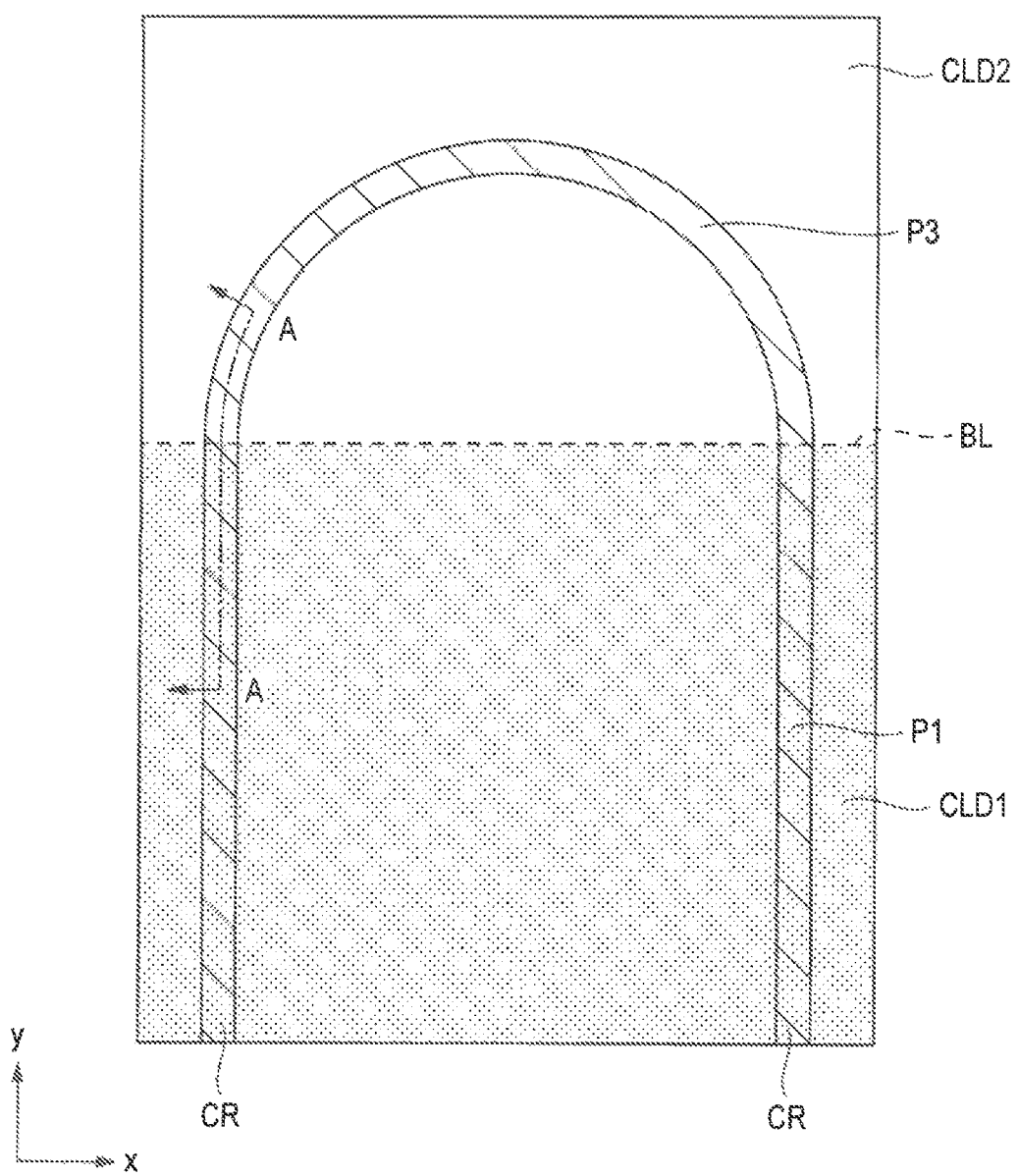
FIG. 1 shows a schematic configuration of an optical waveguide of the related art.

In the below-described embodiments, a description will be made after divided into a plurality of sections or embodiments if necessary for the sake of convenience. These sections or embodiments are not independent from each other unless otherwise particularly specified, but one of them may be a modification example, details, a complementary description, or the like of a part or whole of the other one.

In the below-described embodiments, when a reference is made to the number or the like (including the number, value, amount, range, or the like) of a component, the number is not limited to a specified number but may be more or less than the specified number, unless otherwise particularly specified or principally apparent that the number is limited to the specified number.

Further, it is needless to say that in the below-described embodiments, the constituent component (including component step or the like) is not always essential unless otherwise particularly specified or principally apparent that it is essential.

Similarly, in the below-described embodiments, when a reference is made to the shape, positional relationship, or the like of the constituent component, a component substantially approximate or analogous thereto in shape or the like is also embraced unless otherwise particularly specified or principally apparent that it is not. This also applies to the above-described number and range.

In all the drawings for describing the embodiments, the same members will be identified by the same reference numerals in principle and overlapping descriptions will be omitted. Even a plan view is sometimes hatched to facilitate understanding of it.

First Embodiment

<Description of Related Art>

First, after description of the related art, room for improvement which the related art has will be described. A technical concept of First Embodiment for reducing the room for improvement of the related art will next be described.

FIG. 1 shows a schematic configuration of an optical waveguide of the related art. The optical waveguide of the related art shown in FIG. 1 has a core layer CR formed on a substrate (refer to FIG. 2 described later). As shown in FIG. 1, this core layer CR is comprised of a linear portion P1 extending in a y direction (first direction) and a curved portion P3 having a finite radius of curvature. In FIG. 1, a boundary line BL for discriminating the linear portion P1 from the curved portion P3 is shown. This means that in FIG. 1, the linear portion P1 of the core layer CR is present below the boundary line BL in this drawing and the curved portion P3 of the core layer CR is present above the boundary line BL on this drawing. As shown in FIG. 1, a clad layer CLD1 covers the linear portion P1 of the core layer CR located below the boundary line BL in this drawing. On the other hand, as shown in FIG. 1, a clad layer CLD2 covers the curved portion P3 of the core layer CR located above the boundary line BL in this drawing.

In the related art, the refractive index of the clad layer CLD1 is lower than that of the core layer CR and at the same time, the refractive index of the clad layer CLD2 is also lower than that of the core layer CR. At the same time, the refractive index of the clad layer CLD1 is different from the refractive index of the clad layer CLD2. More specifically, the refractive index of the clad layer CLD1 is greater than that of the clad layer CLD2.

The reason why the refractive index of the clad layer CLD1 and the refractive index of the clad layer CLD2 are both made lower than the refractive index of the core layer CR will hereinafter be described. For example, in FIG. 1, the linear portion of the optical waveguide is comprised of the linear portion P1 of the core layer CR and the clad layer CLD1 that covers the linear portion P1 of the core layer CR. At this time, in the optical waveguide, light propagates inside the core layer CR. In order to confine light inside the core layer CR, the refractive index of the clad layer CLD1 is made lower than that of the core layer CR in the linear portion P1 of the core layer CR so as to satisfy a total reflection condition in a boundary region between the core layer CR and the clad layer CLD1. Similarly, in order to confine light inside the core layer CR, the refractive index of the clad layer CLD1 is made lower than that of the core layer CR in the curved portion P3 of the core layer CR so as to satisfy a total reflection condition in a boundary region between the core layer CR and the the clad layer CLD2.

Next, the reason why the refractive index of the clad layer CLD2 that covers the curved portion P3 of the core layer CR is made lower than that of the clad layer CLD1 that covers the linear portion P1 of the core layer CR will be described. For example, since the curved portion P3 of the core layer CR has a finite radius of curvature, limitation becomes severer in the total reflection condition in the curved portion P3 of the core layer CR than in the total reflection condition in the linear portion P1 of the core layer from the standpoint of reducing optical loss. This means that the refractive index of the clad layer CLD2 that covers the curved portion P3 of the core layer CR should be made lower than that of the clad layer CDL1 that covers the linear portion P1 of the core layer CR. In other words, limitation is severer in the total reflection condition in the curved portion P3 of the core layer CR than in the total reflection condition in the linear portion P1 of the core layer so that a difference in refractive index between the core layer CR and the clad layer CLD2 in the curved portion P3 of the core layer CR should be made larger than a difference in refractive index between the core layer CR and the clad layer CLD1 in the linear portion P1 of the core layer CR.

Considering that satisfaction of the total reflection condition in the curved portion P3 of the core layer CR inevitably leads to satisfaction of the total reflection condition in the linear portion P1 of the core layer, it may be possible to make the difference in refractive index between the core layer CR and the clad layer CLD1 in the linear portion P1 of the core layer CR equal to the difference in refractive index between the core layer CR and the clad layer CLD2 in the curved portion P3 of the core layer CR. This means that it may be possible to form the clad layer CLD1 that covers the linear portion P1 of the core layer CR and the clad layer CLD2 that covers the curved portion P3 of the core layer CR from the same clad layer. In this case, it becomes unnecessary to provide the clad layer CLD1 and the clad layer CLD2 different in refractive index from each other, which is advantageous because an optical waveguide having simplified configuration can be provided.

If the difference in refractive index between the core layer CR and the clad layer CLD1 in the linear portion P1 is made unnecessarily large, optical loss in the linear portion of the core layer CR becomes higher. This phenomenon will next be described.

From the standpoint of geometric optics, whether or not a difference in refractive index between the core layer CR and the clad layer CLD1 in the linear portion P1 of the core layer CR is made unnecessarily large, optical loss in the linear portion P1 of the core layer CR is presumed not to increase, because the total reflection condition in the linear portion P1 of the core layer CR is anyway satisfied. In other words, from the standpoint of geometric optics, it is concluded that no light leaks from the core layer CR to the clad layer CLD1 if the total reflection condition is satisfied so that no rational reason of the increase in optical loss in the linear portion of the core layer CR can be found.

In this point, actual light is not a ray of light assumed in geometric optics but a wave motion which is a kind of an electromagnetic wave so that the propagation of light should be considered from the standpoint of wave optics. According to the wave optics, even if the total reflection condition in the linear portion P1 of the core layer CR is satisfied, light slightly oozes out to the clad layer CLD1. This light oozing out to the clad layer CLD1 is called "evanescent light". The greater this evanescent light, the higher the optical loss. The intensity of evanescent light oozing out to the clad layer CLD1 depends on the refractive index difference between the core layer CR and the clad layer CLD1. In other words, as the refractive index difference between the core layer CR and the clad layer CLD1 becomes larger, the intensity of the evanescent light oozing out to the clad layer CLD1 becomes higher. Therefore, when the difference in refractive index between the core layer CR and the clad layer CLD1 in the linear portion P1 of the core layer CR is made unnecessarily large, the intensity of the evanescent light increases, resulting in an increase in the loss of light propagating in the core layer CR.

Based on the above-described finding, the configuration in which the same clad layer is used for the formation of both the clad layer CLD1 that covers the linear portion P1 of the core layer CR and the clad layer CLD2 that covers the curved portion P3 of the core layer CR is not adopted even if the satisfaction of the total reflection condition in the curved portion P3 of the core layer CR inevitably leads to satisfaction of the total reflection condition in the linear portion P1 of the core layer CR.

The configuration of the optical waveguide in the related art shown in FIG. 1 is therefore adopted because (1) limitation becomes severer in the total reflection condition in the curved portion P3 of the core layer CR than in the total reflection condition in the linear portion P1 of the core layer CR and (2) optical loss increases by making a difference in refractive index between the core layer CR and the clad layer CLD1 in the linear portion P1 of the core layer CR unnecessarily large. In short, because of the above-described reasons, the related art is adopted in which the clad layer CLD1 that covers the linear portion P1 of the core layer CR and the clad layer CLD2 that covers the curved portion P3 of the core layer CR are comprised of clad layers having different refractive indices, respectively.

<Investigation of Improvement>

The investigation by the present inventors however has revealed newly that the above-described related art has the following room for improvement so that it will be described below.

Figure 2:
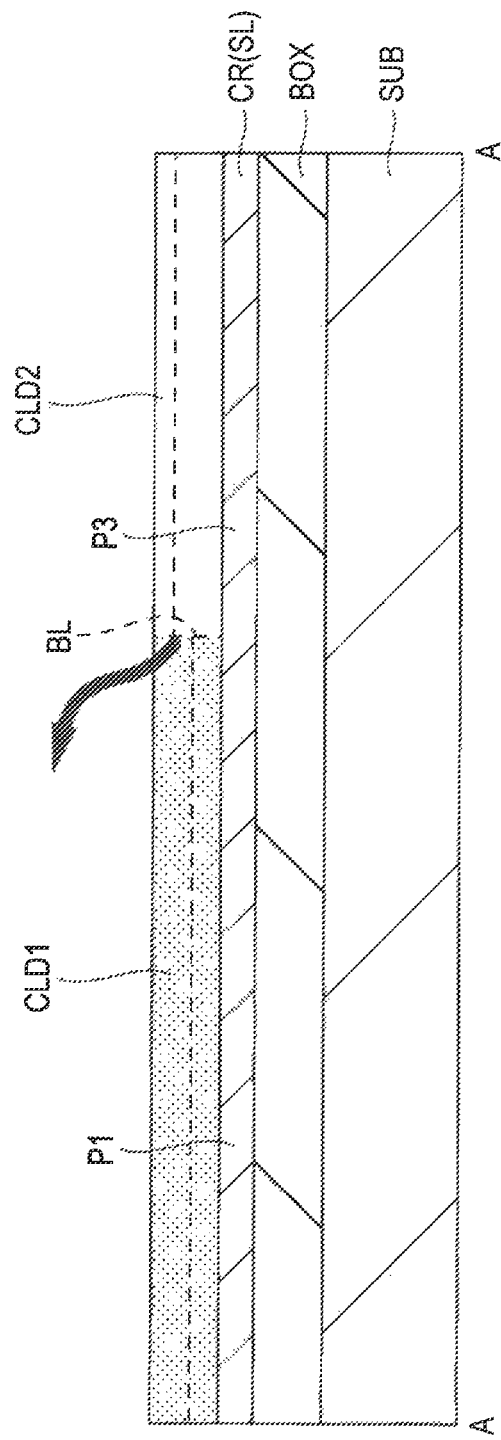
FIG. 2 is a schematic cross-sectional view taken along the line A-A of FIG. 1.

FIG. 2 is a schematic cross-sectional view taken along the line A-A of FIG. 1. As shown in FIG. 2, the optical waveguide of the related art is formed on a SOI (silicon on insulator) substrate. Described specifically, the SOI substrate is comprised of a support substrate SUB, a buried insulating layer BOX formed on this support substrate SUB, and a silicon layer SL formed on this buried insulating layer BOX. The silicon layer SL of the SOI substrate is processed into a core layer CR configuring the optical waveguide. The core layer CR has, on a linear portion P1 thereof, a clad layer CLD1, while the core layer CR has, on a curved portion P3 thereof, a clad layer CLD2.

No particular limitation is imposed on the size of the core layer CR insofar as it permits appropriate propagation of light inside thereof. For example, the width of the core layer CR is 400 nm and the height of the core layer CR is 200 nm.

Here, the refractive index of the clad layer CLD1 is greater than that of the clad layer CLD2. A refractive index difference between the core layer CR and the clad layer CLD1 in the linear portion P1 of the core layer CR is not the same as a refractive index difference between the core layer CR and the clad layer CLD2 in the curved portion P3 of the core layer CR. More specifically, the refractive index difference between the core layer CR and the clad layer CLD1 in the linear portion P1 of the core layer CR is smaller than the refractive index difference between the core layer CR and the clad layer CLD2 in the curved portion 93 of the core layer CR. This means the presence of discontinuity in refractive index difference between the core layer CR and the respective clad layers (CDL1 and CDL2) at the boundary line BL shown in FIG. 2.

As described above, in the related art, the refractive index difference between the core layer CR and the clad layer CLD1 is smaller than that between the core layer CR and the clad layer CLD2. An increase in the refractive index difference between the core layer CR and the respective clad layers leads to an increase in the oozing distance of an evanescent light to the clad layer. As a broken line in a horizontal direction in FIG. 2 shows, the oozing distance of evanescent light to the clad layer CLD2 that covers the curved portion P3 of the core layer CR becomes greater than the oozing distance of evanescent light to the clad layer CLD1 that covers the linear portion P1 of the core layer CR. The oozing distance of evanescent light discontinuously changes with the boundary line BL between the clad layer CLD1 and the clad layer CLD2 as a boundary. As a result, scattering (reflection) of light occurs at the boundary line BL. Considering that light is one of electromagnetic waves, this phenomenon can be understood from similarity to, for example, a phenomenon that reflection of an electromagnetic wave occurs due to impedance mismatching attributable to impedance discontinuity.

Thus, the present inventors have found newly that in the related art, light scattering (reflection) inevitably occurs in a boundary region (boundary line BL) between the linear portion P1 and the curved portion P3 because the clad layer CLD1 that covers the linear portion P1 of the core layer CR and the clad layer CLD2 that covers the curved portion P3 of the core layer CR are comprised of clad layers different in refractive index, respectively. In other words, the present inventors have found newly that the mode (energy distribution) of light propagating in the core layer CR becomes discontinuous in the boundary region, resulting in occurrence of stray light such as scattered light (reflected light). Occurrence of scattering of light means an increase in optical loss by this new mechanism. Described specifically, the optical loss of the optical waveguide inevitably increases in the related art because of discontinuity of the refractive index in the boundary region (boundary line BL) between the clad layer CLD1 and the clad layer CLD2. In short, there is room for improvement in the related art from the standpoint of reducing the optical loss of the optical waveguide. In the optical waveguide of First Embodiment, therefore, some measures are taken for reducing the room for improvement present in the related art. The technical concept of the thus-obtained First Embodiment will hereinafter be described.

<Basic Concept of First Embodiment>

The basic concept of First Embodiment is that the discontinuity in refractive index between a first clad layer and a second clad layer is mitigated on the premise that the refractive index of the first clad layer that covers the linear portion of a core layer is differentiated from the refractive index of the second clad layer that covers the curved portion of the core layer. In particular, the basic concept of First Embodiment is that in the cross-section orthogonal to the extending direction of the optical waveguide, a boundary region BR including a portion where both the first clad layer and the second clad layer contact with the surface of the core layer CR and having an finite width in the extending direction is provided and both the first clad layer and the second clad layer contacting with the core layer CR are caused to exist in the boundary region BR so that, in the cross-section orthogonal to the traveling direction (extending direction of the optical waveguide) of light in this boundary region BR, a ratio of the second clad layer to the first clad layer becomes a finite value more than 0. The term "width of the boundary region BR" as used herein means the length of the optical waveguide in a region where both the first clad layer and the second clad layer contact with the surface of the core layer CR in the cross-section orthogonal to the extending direction of the optical waveguide.

According to such a basic concept of First Embodiment, the discontinuity of the refractive index in the boundary region BR can be mitigated. For example, without application of the basic concept of First Embodiment, the boundary region BR with a finite width does not exist. In this case, the clad layer that covers the core layer suddenly changes from the first clad layer to the second clad layer in the traveling direction of light. This means that a ratio of the second clad layer to the first clad layer drastically changes from "0" to "∞" and also means an increase in the discontinuity of the refractive index between the first clad layer and the second clad layer.

When the basic concept of First Embodiment is applied, on the other hand, the boundary region BR including a portion where both the first clad layer and the second clad layer contact with the surface of the core layer CR and having a finite width is present in the cross-section orthogonal to the traveling direction of light in the optical waveguide. Both the first clad layer and the second clad layer contacting with the core layer CR are present in the boundary region BR with a finite width so that a ratio of the second clad layer to the first clad layer contacting with the core layer CR becomes a finite value more than 0 in the cross-section orthogonal to the traveling direction of light in this boundary region BR. As a result, a change from the first clad layer to the second clad layer becomes gradual in the traveling direction of light. The ratio of the second clad layer to the first clad layer changes as follows: "0"→"finite value more than 0"→"∞". This means that compared with the case where the basic concept of First Embodiment is not applied, the discontinuity of the refractive index between the first clad layer and the second clad layer is mitigated.

According to the basic concept of First Embodiment, the discontinuity of the refractive index between the first clad layer and the second clad layer is mitigated so that scattering of light due to the discontinuity of the refractive index can be suppressed. The configuration example of an optical waveguide obtained by realizing the basic concept of First Embodiment will hereinafter be described.

<Configuration of Optical Waveguide>

Figure 3:
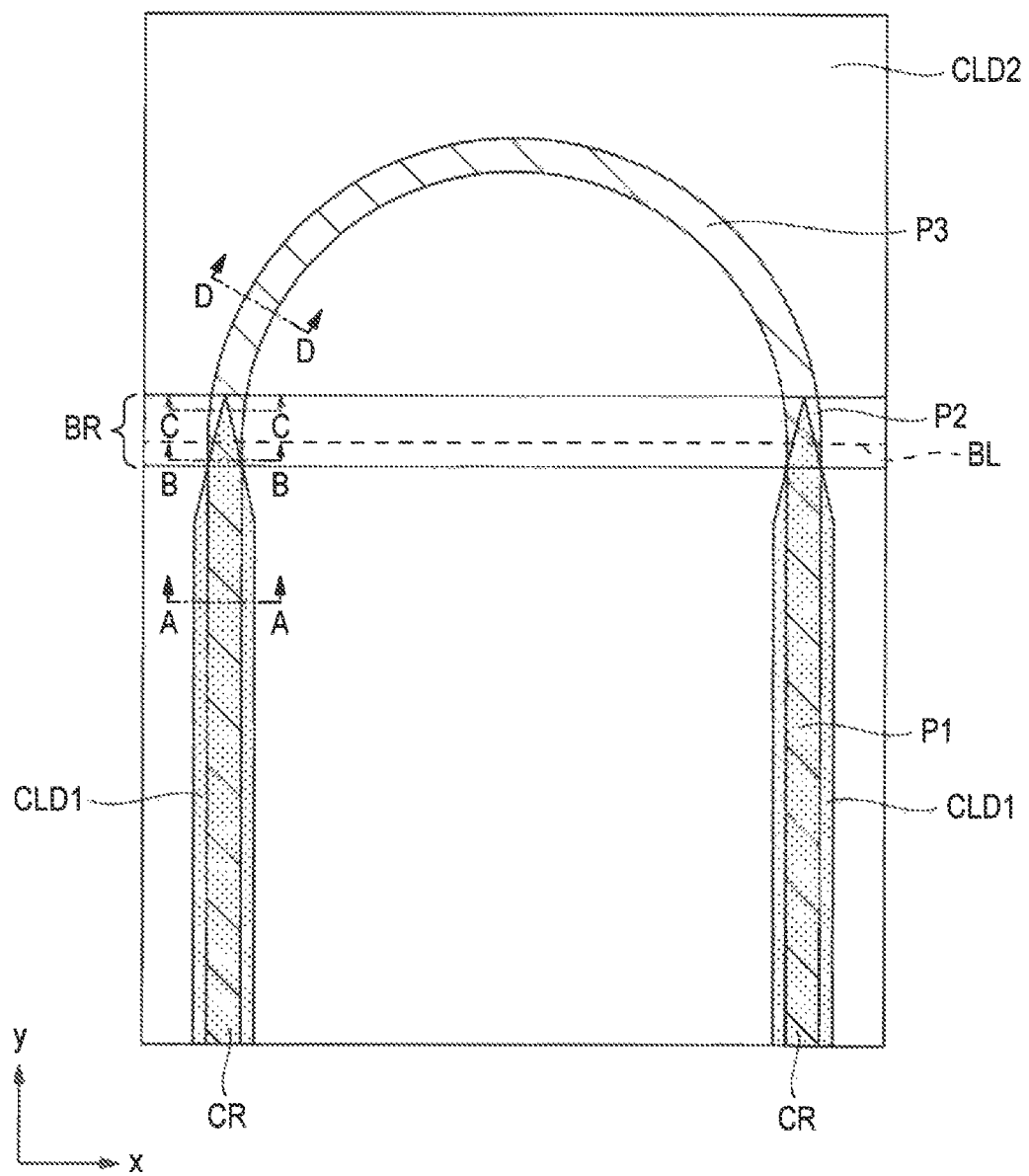
FIG. 3 shows a schematic configuration of an optical waveguide of First Embodiment.

FIG. 3 shows the schematic configuration of the optical waveguide of First Embodiment. In FIG. 3, the optical waveguide of First Embodiment has a core layer CR. As shown in FIG. 3, this core layer CR is comprised of a linear portion P1 extending in the y direction (first direction), a curved portion P3 having a finite radius of curvature, and a boundary portion P2 comprised of a portion of the linear portion P1 and a portion of the curved portion P3. FIG. 3 shows a boundary line BL for dividing the core layer CR into the linear portion P1 and the curved portion P3. The boundary portion P2 extends over the boundary line BL. In the optical waveguide of First Embodiment, the boundary portion P2 covers a portion of the linear portion P1 and a portion of the curved portion P3. In short, the boundary portion P2 is comprised of a portion extending in the y direction (first direction) and a portion having a finite radius of curvature. The radius of curvature is not particularly limited and is, for example, 100 μm.

As FIG. 3 shows, the clad layer CLD1 covers the linear portion P1 of the core layer CR. As shown in FIG. 3, on the other hand, the clad layer CLD2 covers the curved portion P3 of the core layer CR. Further, as shown in FIG. 3, the boundary portion P2 of the core layer CR has therein both a portion covered with the clad layer CLD1 and a portion covered with the clad layer CLD2. The curved portion P3 of the core layer CR is not particularly limited. For example, the curved portion P3 of the core layer CR is arc-shaped in plan view. In the present embodiment, the curved portion P3 of the core layer has, in plan view, a shape similar to that of the curved portion of U shape.

Thus, the optical waveguide of First Embodiment is equipped with the core layer CR, the clad layer CLD1 having a refractive index lower than that of the core layer CR, and the clad layer CLD2 having a refractive index lower than that of the core layer and at the same time, lower than that of the clad layer CLD1. The core layer CR has the linear portion P1 that contacts with the clad layer CLD1 and overlaps with the clad layer CLD1 in plan view. The core layer CR has the boundary portion P2 that has a first overlapping portion contacting with the clad layer CLD1 and overlapping with the clad layer CLD1 in plan view and a second overlapping portion contacting with the clad layer CLD2 and overlapping with the clad layer CLD2 in plan view and at the same time, is adjacent to the linear portion P1. Further, the core layer CR has the curved portion P3 that contacts with the clad layer CLD2, overlaps with the clad layer CLD2 in plan view, is adjacent to the boundary portion P2, and has a finite radius of curvature. In First Embodiment, the planar shape of the first overlapping portion contacting with the clad layer CLD1 and overlapping with the clad layer CLD1 in plan view includes a taper shape as shown in FIG. 3.

Figure 4:
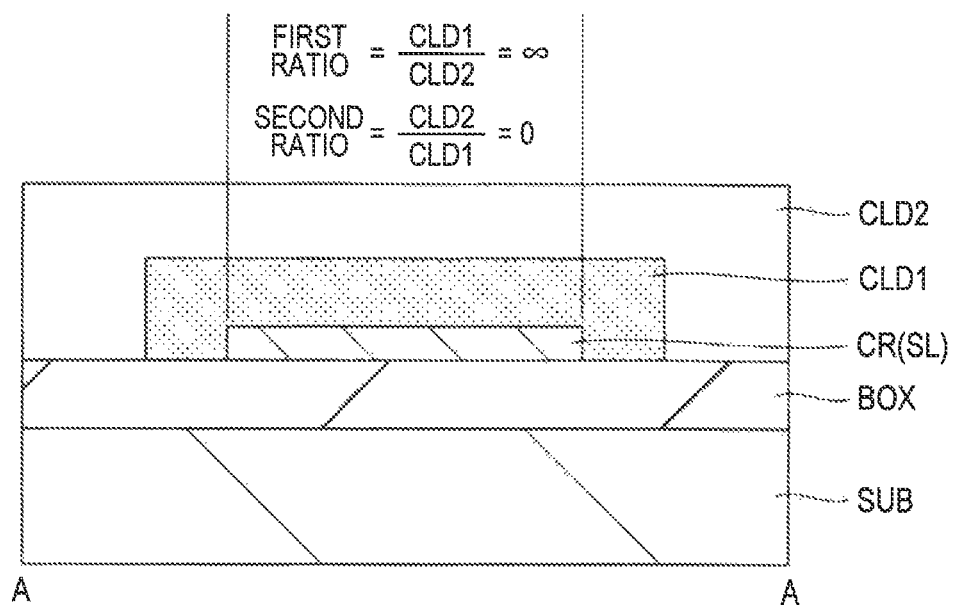
FIG. 4 is a cross-sectional view taken along the line A-A of FIG. 3.

FIG. 4 is a cross-sectional view taken along the line A-A of FIG. 3. This means that it is a cross-sectional view of the core layer CR shown in FIG. 3 in the linear portion P1. As shown in FIG. 4, the optical waveguide of First Embodiment is formed on a SOI substrate. More specifically, the SOI substrate is comprised of, for example, a support substrate SUB, a buried insulating film BOX made of a silicon oxide film formed on this support substrate SUB, and a silicon layer SL formed on the buried insulating layer BOX. The silicon layer SL of the SOI substrate is processed into a core layer CR configuring the optical waveguide. The core layer CR is covered with a clad layer CLD1 made of a silicon oxynitride film (SiON film) contacting with the core layer CR and this clad layer CLD1 is covered with a clad layer CLD2 made of a SiOF film contacting with the clad layer CLD1. As shown in FIG. 4, since the core layer CR contacts with the clad layer CLD1 but not contacts with the clad layer CLD2, a first ratio, that is, a ratio of the clad layer CLD1 to the clad layer CLD2 at a position contacting with the core layer CR in the cross-section shown in FIG. 4 becomes "∞ (infinity)". In other words, a second ratio, that is, a ratio of the clad layer CLD2 to the clad layer CLD1 becomes "0" at the position contacting with the core layer CR in the cross-section of FIG. 4.

Figure 5:
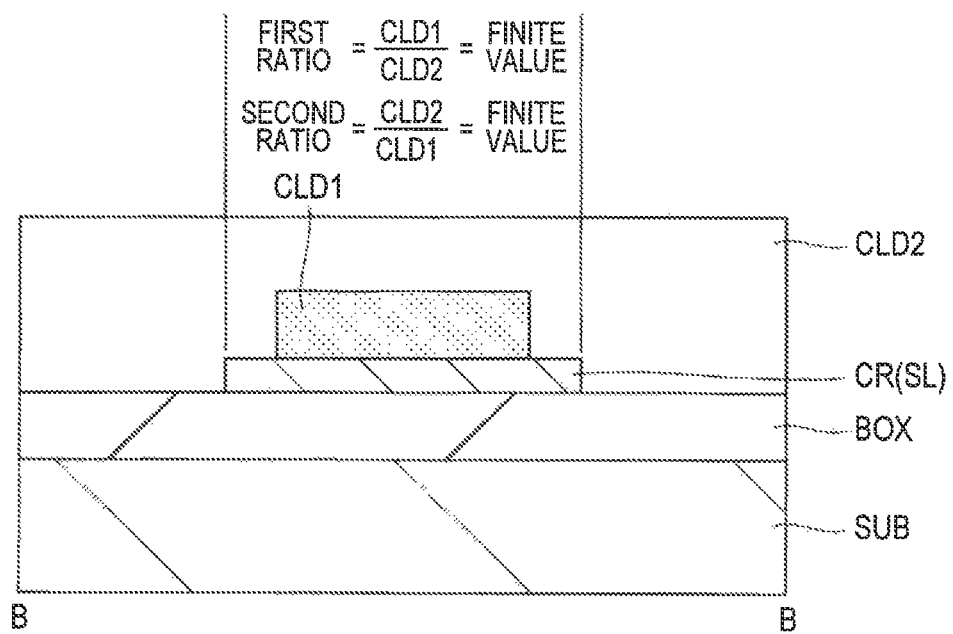
FIG. 5 is a cross-sectional view taken along the line B-B of FIG. 3.

FIG. 5 is a cross-sectional view taken along the line B-B of FIG. 3. It is a cross-sectional view of the core layer CR shown in FIG. 3 in the boundary portion P2 and is also a cross-sectional view at a position located on the side of the linear portion P1 with respect to the center in the extending direction of the boundary portion P2. As shown in FIG. 5, since the core layer CR contacts with the clad layer CLD1 and also contacts with the clad layer CLD2, a first ratio, that is, a ratio, at a position in which each of the clad layer CLD1 and the clad layer CLD2 contacts with the core layer CR in the cross-section of FIG. 5 becomes "a finite value more than 0". In other words, a second ratio, that is, a ratio, at the position in which each of the clad layer CLD1 and the clad layer CLD2 contacts with the core layer CR in the cross-section of FIG. 5 also becomes "a finite value more than 0".

Figure 6:
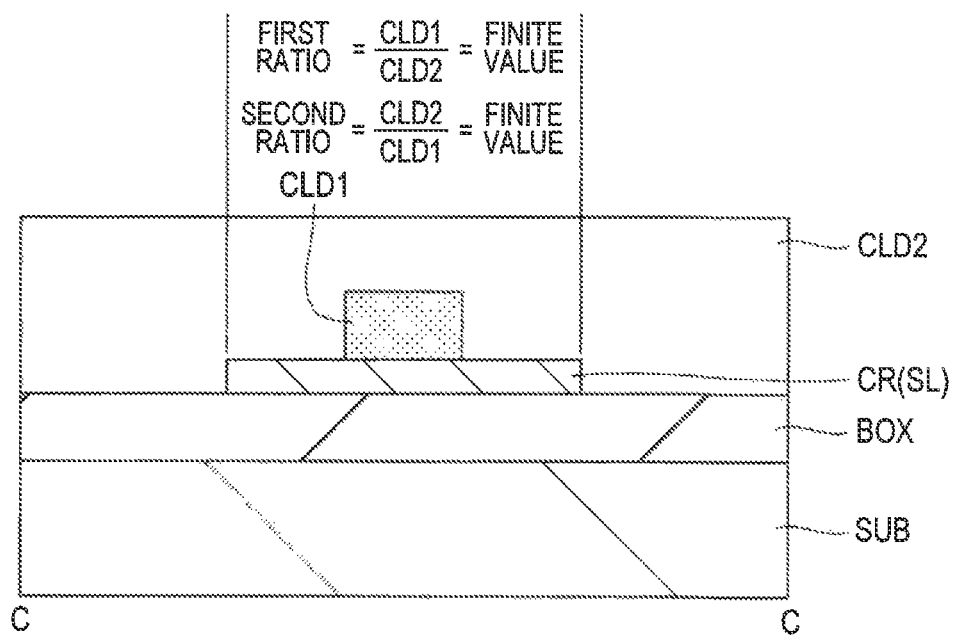
FIG. 6 is a cross-sectional view taken along the line C-C of FIG. 3.

FIG. 6 is a cross-sectional view taken along the line C-C of FIG. 3. It is a cross-sectional view of the core layer CR shown in FIG. 3 in the boundary portion P2 and is also a cross-sectional view at a position located on the side of the curved portion P3 with respect to the center in the extending direction of the boundary portion P2. As shown in FIG. 6, since the core layer CR is contiguous to the clad layer CLD1 and also contiguous to the clad layer CLD2, a first ratio, that is, a ratio, at a position in which each of the clad layer CLD1 and the clad layer CLD2 contacts with the core layer CR in the cross-section of FIG. 6 becomes "a finite value more than 0". In other words, a second ratio, that is, a ratio, at a position in which each of the clad layer CLD1 and the clad layer CLD2 contacts with the core layer CR in the cross-section of FIG. 6 becomes "a finite value more than 0".

Figure 7:
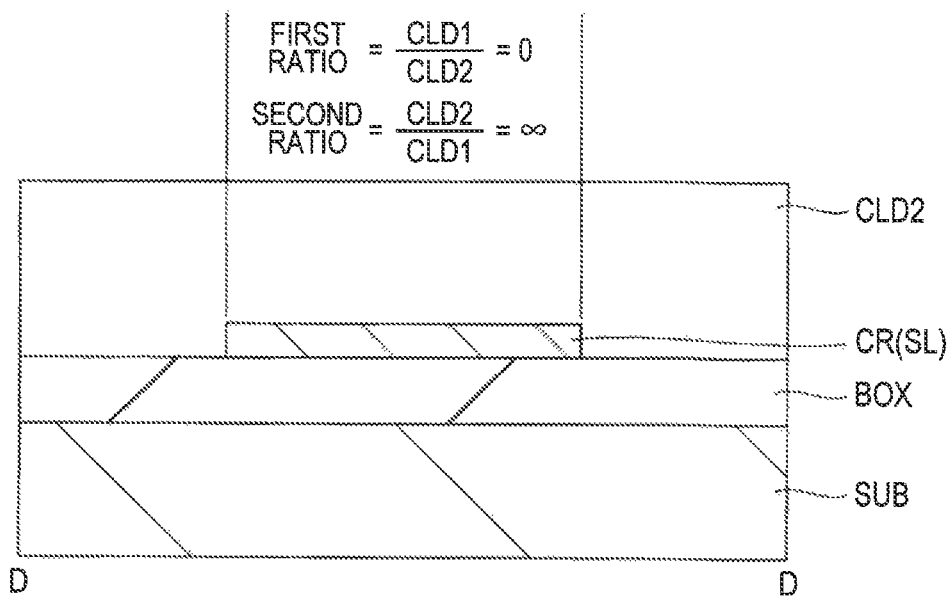
FIG. 7 is a cross-sectional view taken along the line D-D of FIG. 3.

FIG. 7 is a cross-sectional view taken along the line D-D of FIG. 3. It is a cross-sectional view of the core layer CR shown in FIG. 3 in the curved portion P3. As shown in FIG. 7, since the core layer CR contacts with the clad layer CLD2 but does not contact with the clad layer CLD1, a first ratio, that is, a ratio of the clad layer CLD1 to the clad layer CLD2 at a position contiguous to the core layer CR in the cross-section of FIG. 7 becomes "0". In other words, a second ratio, that is, a ratio of the clad layer CLD2 to the clad layer CLD1 becomes "∞ (infinity)" at the position contiguous to the core layer CR in the cross-section of FIG. 7.

Based on the above-described finding, the first ratio at the position in which each of the clad layer CLD1 and the clad layer CLD2 contacts with the core layer CR in a cross-section orthogonal to an extending direction of the boundary portion P2 and passing through the boundary portion P2, is lower than the first ratio at the position in which each of the clad layer CLD1 and the clad layer CLD2 contacts with the core layer CR in a cross-section orthogonal to an extending direction of the linear portion P1 and passing through the linear portion P1, and is greater than the first ratio at the position in which each of the clad layer CLD1 and the clad layer CLD2 contacts with the core layer in a cross-section orthogonal to an extending direction of the curved portion P3 and passing through the curved portion P3.

In other words, the second ratio, at the position in which each of the clad layer CLD1 and the clad layer CLD2 contacts with the core layer CR in a cross-section orthogonal to an extending direction of the boundary portion P2 and passing through the boundary portion P2, is greater than the second ratio at the position in which each of the clad layer CLD1 and the clad layer CLD2 contacts with the core layer CR in a cross-section orthogonal to an extending direction of the linear portion P1 and passing through the linear portion P1, and is lower than the second ratio at the position in which each of the clad layer CLD1 and the clad layer CLD2 contacts with the core layer in a cross-section orthogonal to an extending direction of the curved portion P3 and passing through the curved portion P3.

As is apparent from the comparison between FIGS. 5 and 6, the first ratio at the position contacting with the core layer CR in the cross-section shown in FIG. 5 becomes higher than the first ratio at the position contacting with the core layer CR in the cross-section shown in FIG. 6. In other words, as is apparent from the comparison between FIGS. 5 and 6, the second ratio at the position contacting with the core layer CR in the cross-section shown in FIG. 5 becomes lower than the second ratio at the position contacting with the core layer CR in the cross-section shown in FIG. 6.

In particular, in the optical waveguide of First Embodiment, as shown in FIG. 3, the planar shape of the first overlapping portion contacting with the clad layer CLD1 and overlapping with the clad layer CLD1 in plan view is configured to include a taper shape. In the boundary portion P2 of the core layer CR, therefore, the area of the first overlapping portion that overlaps with the clad layer CLD1 in plan view decreases as it approaches the curved portion P3 of the core layer CR. In other words, in the boundary portion P2 of the core layer CR, the area of the second overlapping portion that overlaps with the clad layer CLD2 in plan view increases as it approaches to the curved portion P3 of the core layer CR. This means that the first ratio at the position contacting with the core layer CR decreases as going from the cross-section of FIG. 5 orthogonal to the extending direction of the boundary portion P2, passing through the boundary portion P2, and located on the side of the linear portion P1 with respect to the center to the cross-section of FIG. 6 orthogonal to the extending direction of the boundary portion P2, passing through the boundary portion P2, and located on the side of the curved portion P3 with respect to the center. In other words, the second ratio of them at the position contacting with the core layer CR increases as going from the cross-section of FIG. 5 orthogonal to the extending direction of the boundary portion P2, passing through the boundary portion P2, and located on the side of the linear portion P1 with respect to the center to the cross-section of FIG. 6 orthogonal to the extending direction of the boundary portion P2, passing through the boundary portion P2, and located on the side of the curved portion P3 with respect to the center.

<Characteristics of First Embodiment>

As described above, the basic concept of First Embodiment is that a boundary region including a portion where both the first clad layer and the second clad layer contact with the surface of the core layer CR and having an finite width is provided in the cross-section orthogonal to the extending direction of the optical waveguide and in the cross-section orthogonal to the traveling direction of light in this boundary region, both the first clad layer and the second clad layer are caused to exist in the boundary region so that a ratio of the second clad layer to the first clad layer becomes a finite value more than 0.

The first characteristic of First Embodiment that has realized the above basic concept assumes that, for example, as shown in FIG. 3, the core layer CR is equipped with the boundary portion P2 having a finite width between the linear portion P1 of the core layer CR covered with the clad layer CLD1 and the curved portion P3 of the core layer CR covered with the clad layer CLD2 having a refractive index different from that of the clad layer CLD1. The first characteristic of First Embodiment is that, for example, in the cross-section orthogonal to the extending direction of the boundary portion P2, the boundary portion P2 of the core layer CR is covered with the clad layer CLD1 and the clad layer CLD2 having respectively different refractive indices so that a ratio of the clad layer CLD2 to the clad layer CLD1 becomes a finite value more than 0. According to such first characteristic of First Embodiment, the refractive index of the clad layer that covers the core layer changes substantially gradually in the extending direction of the boundary portion P2 which is a light traveling direction. This is because in First Embodiment, as shown in FIGS. 5 and 6, the boundary portion P2 of the core layer CR is configured so as to contact with both the clad layer CLD1 and the clad layer CLD2 having respectively different refractive indices so that the substantial refractive index of the clad layer that covers the boundary portion P2 of the core layer CR can be regarded as a value between the refractive index of the clad layer CLD1 and the refractive index of the clad layer CLD2. According to the first characteristic of First Embodiment, therefore, the boundary portion P2 of the core layer seems as if it is covered with a third clad layer having a refractive index between the refractive index of the clad layer CLD1 and the refractive index of the clad layer CLD2. As a result, according to the first characteristic of First Embodiment, the refractive index of the configuration of the present embodiment becomes equal to that of the configuration having the third clad layer having a refractive index between the refractive index of the clad layer CLD1 and the refractive index of the clad layer CLD2 so that discontinuity in refractive index between the clad layer CLD1 and the clad layer CLD2 can be mitigated. The first characteristic of First Embodiment, therefore, can mitigate the discontinuity in refractive index between the clad layer CLD1 and the clad layer CLD2 and therefore can suppress the scattering of light due to discontinuity of a refractive index.

The second characteristic of First Embodiment is that attention is paid to the cross-section orthogonal to the extending direction of the boundary portion P2 and a ratio of the clad layer CLD2 contacting with the core layer CR to the clad layer CLD1 contacting with the core layer CR is increased continuously from the cross-section on the side of the linear portion P1 toward the cross-section on the side of the curved portion P3. More specifically, the second characteristic of First Embodiment is realized by forming, as shown in FIG. 3, the first overlapping portion of the boundary portion P2 which contacts with the clad layer CLD1 of the boundary portion P2 and overlaps with this clad layer CLD1 in plan view to have a triangle shape including a taper shape. According to the second characteristic of First Embodiment thus realized, the refractive index of the clad layer that covers the boundary portion P2 of the core layer CR continuously changes from the refractive index of the clad layer CLD1 to the refractive index of the clad layer CLD2 from the linear portion P1 of the core layer CR toward the curved portion P3 of the core layer CR. As a result, by the second characteristic of First Embodiment, the discontinuity in refractive index between the clad layer CLD1 and the clad layer CLD2 is mitigated further. According to the second characteristic of First Embodiment, the discontinuity in refractive index between the clad layer CLD1 and the clad layer CLD2 can be mitigated further so that scattering of light due to the discontinuity in refractive index can be suppressed effectively.

Next, the third characteristic of First Embodiment is that with the adoption of the above-described first characteristic as a premise, the refractive index of the clad layer CLD2 that covers the curved portion P3 of the core layer CR is made lower than the refractive index of the clad layer CLD1 that covers the linear portion P1 of the core layer CR. Here, for example, the curved portion P3 of the core layer CR has a finite radius of curvature so that from the standpoint of suppressing optical loss due to scattering, limitation to the total reflection condition of the curved portion P3 of the core layer CR becomes severer than that to the total reflection condition in the linear portion P1 of the core layer. In this point, the third characteristic of First Embodiment, that is, making the refractive index of the clad layer CLD2 that covers the curved portion P3 of the core layer CR lower than the refractive index of the clad layer CLD1 that covers the linear portion P1 of the core layer CR facilitates securement of the total reflection condition in the curved portion P3 of the core layer CR. This means that the third characteristic of First Embodiment can make the radius of curvature of the curved portion P3 of the core layer CR smaller while securing the total reflection condition. Since the radius of curvature of the curved portion P3 of the core layer CR can be made smaller, the core layer CR with a small radius of curvature can be adopted as a waveguide and this enables high integration of an optical waveguide. Thus, the third characteristic of First Embodiment contributes to miniaturize a semiconductor device including an optical waveguide.

Further, according to the third characteristic of First Embodiment, the refractive index of the clad layer CLD1 that covers the linear portion P1 of the core layer CR can be made higher than the refractive index of the clad layer CLD2 that covers the curved portion P3 of the core layer CR. This means that a difference in refractive index between the core layer CR and the clad layer CLD1 that covers the linear portion P1 of the core layer CR can be made smaller while satisfying the total reflection condition in the linear portion P1 of the core layer CR. Since the difference in refractive index between the core layer CR and the clad layer CLD1 that covers the linear portion P1 of the core layer CR can be made smaller, an oozing distance of evanescent light from the linear portion P1 of the core layer CR to the clad layer CLD1 that covers this linear portion P1 can be reduced. This leads to reduction in optical loss due to the oozing of evanescent light.

Thus, optical loss caused by scattering of light due to discontinuity in refractive index between the clad layer CLD1 and the clad layer CLD2 can be suppressed by the first characteristic of First Embodiment and at the same time, optical loss caused by oozing of evanescent light can be suppressed further by the third characteristic of First Embodiment. Use of the first characteristic and the third characteristic of First Embodiment in combination can therefore reduce the optical loss. According to First Embodiment, therefore, a loss-reduced semiconductor device including an optical waveguide can be provided.

The fourth characteristic of First embodiment is that of the upper surface and the side surface of the core layer CR, the first characteristic of First Embodiment is realized at the upper surface of the core layer CR. In other words, the fourth characteristic of First Embodiment is that the upper surface of the boundary portion P2 of the core layer CR is covered with the clad layer CLD1 and the clad layer CLD2 having respectively different refractive indices so that a ratio of the clad layer CLD2 to the clad layer CLD1 becomes a finite value more than 0. In the fourth characteristic of First Embodiment, on the other hand, the side surface of the boundary portion P2 of the core layer CR is covered with either one of the clad layer CLD1 or the clad layer CLD2. This means that the fourth characteristic of First Embodiment is that in the boundary portion P2 of the core layer CR having an upper surface and a side surface crossing therewith, the upper surface of the boundary portion P2 contacts with both the clad layer CLD1 and the clad layer CLD2, while the side surface of the boundary portion P2 contacts with either one of the clad layer CLD1 or the clad layer CLD2.

The technical significance of this fourth characteristic will hereinafter be described. First, from the standpoint of suppressing light scattering due to discontinuity in refractive index between the clad layer CLD1 and the clad layer CLD2, the above-described first characteristic is desirably realized not only at the upper surface but also at the side surface of the boundary portion P2 of the core layer CR. Realization of the first characteristic at both the upper surface and the side surface of the boundary portion P2 of the core layer CR is however accompanied with manufacturing difficulty. For example, the first characteristic of First Embodiment can be realized by patterning the clad layer CLD1 contacting with the boundary portion P2 of the core layer CR by photolithography. In this case, at the upper surface of the boundary portion P2 of the core layer CR, the clad layer CLD1 can be processed into an intended shape by patterning through photolithography. On the other hand, it is difficult to, after application of a resist film onto the side surface, expose the resist film applied to the side surface to light and is therefore difficult to pattern the clad layer CLD1 into an intended shape by photolithography at the side surface of the boundary portion P2 of the core layer CR.

The area of the upper surface of the core layer CR is larger than the area of the side surface of the core layer CR so that light scattering due to discontinuity in refractive index between the clad layer CLD1 and the clad layer CLD2 can be suppressed sufficiently by realizing the above-described first characteristic only at the upper surface of the boundary portion P2 of the core layer CR. In other words, realization of the first characteristic even at the side surface of the boundary portion P2 of the core layer CR is not necessary even at the sacrifice of manufacturing ease. The technical significance of the fourth characteristic of First Embodiment is that the first characteristic is realized to suppress light scattering due to discontinuity in refractive index between the clad layer CLD1 and the clad layer CLD2 while securing the realistic manufacturing ease.

Modification Example 1

Figure 8:
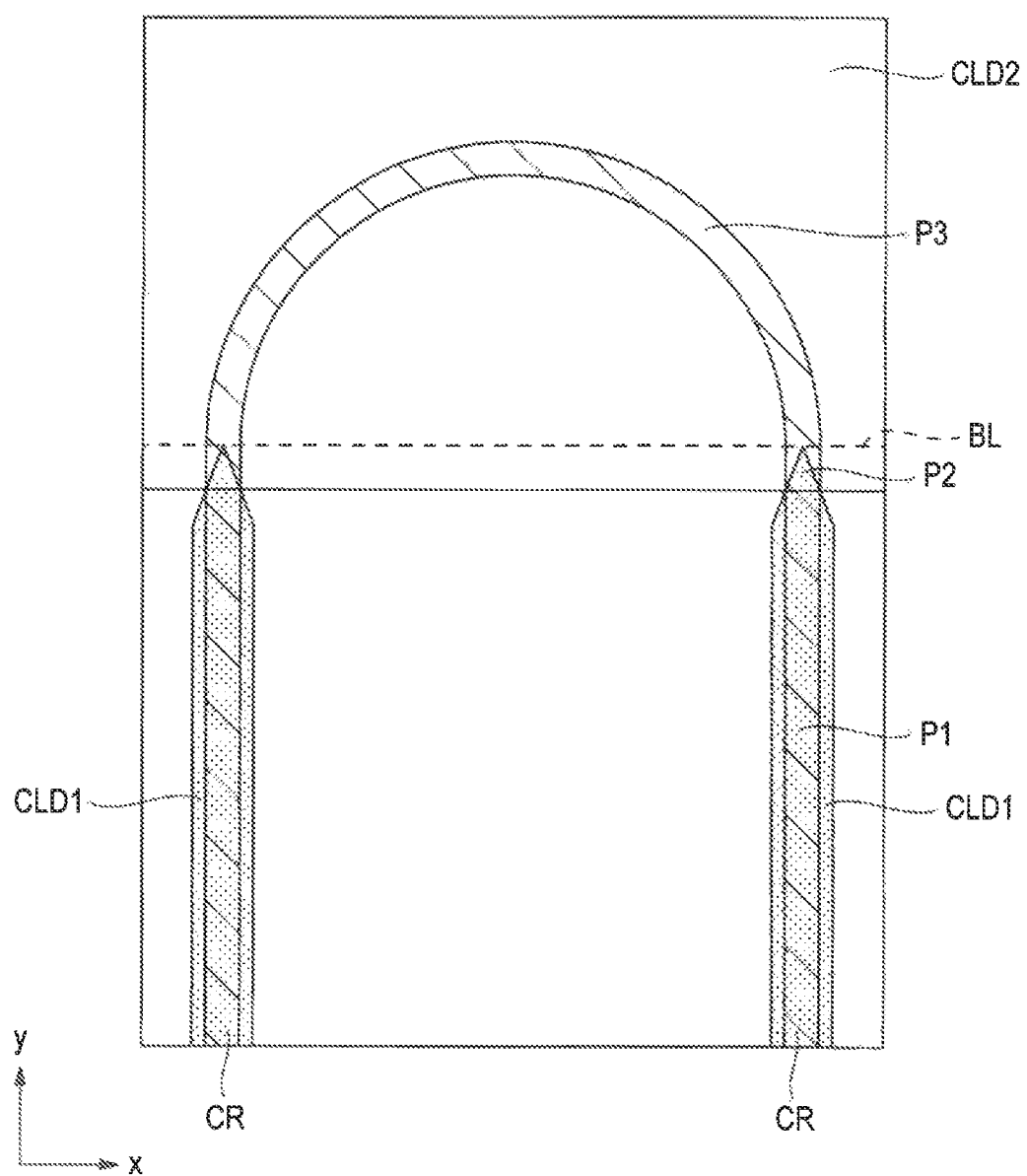
FIG. 8 schematically shows an optical waveguide of Modification Example 1 of First Embodiment.
Figure 9:
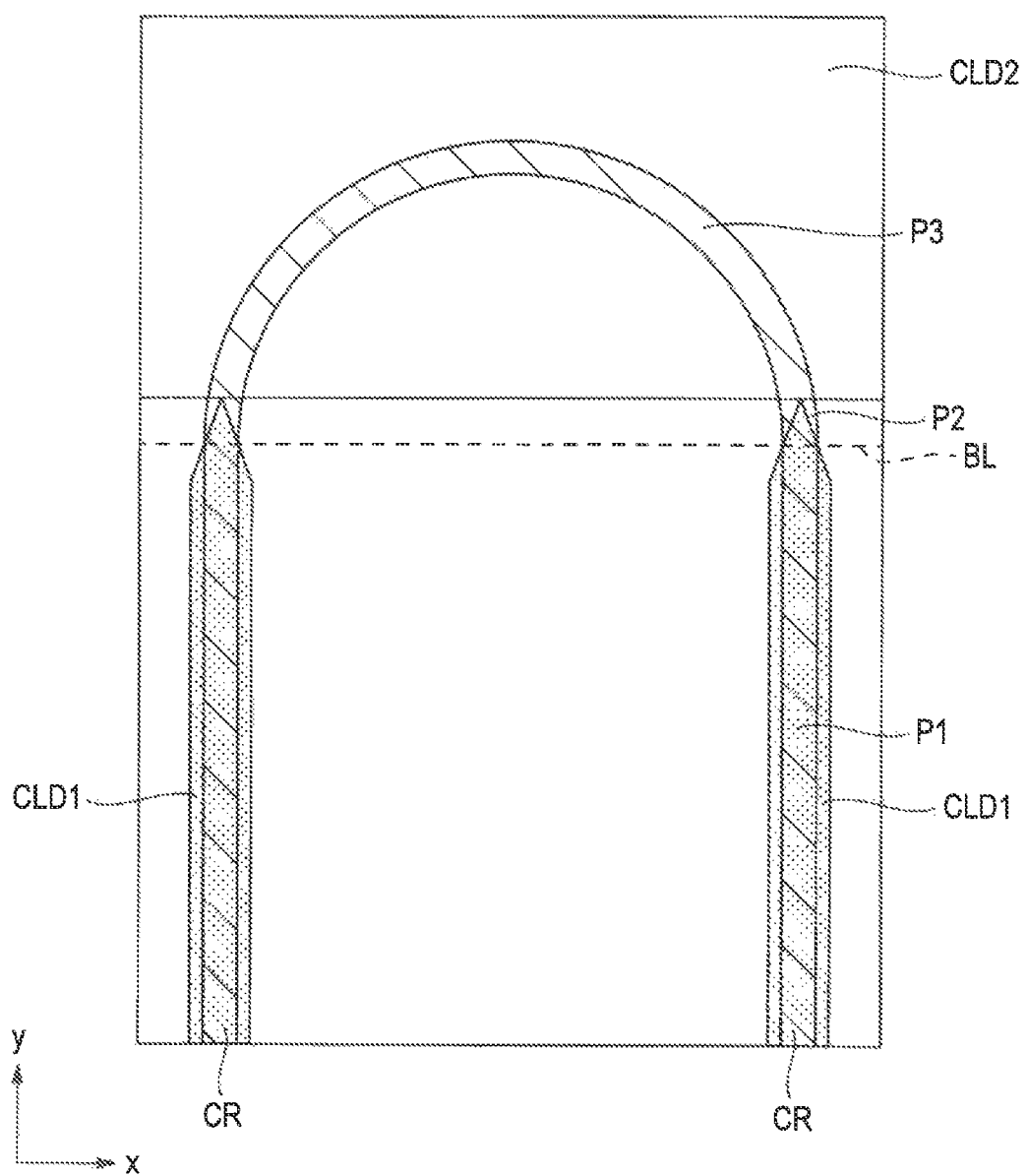
FIG. 9 schematically shows the optical waveguide of Modification Example 1 of First Embodiment.

Modification Example 1 of First Embodiment will next be described. For example, in the optical waveguide of First Embodiment shown in FIG. 3, the boundary portion P2 of the core layer CR extends across the boundary line BL between the linear portion P1 of the core layer CR and the curved portion P3 of the core layer CR. The technical concept of First Embodiment is not limited to it but allows, for example, the boundary portion P2 of the core layer CR to be comprised of a portion extending below the boundary line BL of this drawing in the y direction (first direction), as shown in FIG. 8. In other words, the boundary portion P2 of the core layer CR may be comprised only of a portion of the linear portion P1. Alternatively, as shown in FIG. 9, the boundary portion P2 of the core layer CR may be comprised of a portion having a finite radius of curvature above the boundary line BL in this drawing. In short, the boundary portion P2 of the core layer CR may be comprised only of a portion of the curved portion P3.

Modification Example 2

Modification Example 2 of First Embodiment will next be described. In First Embodiment shown in FIG. 3, the region which is below the boundary line BL in this drawing and is other than the region that covers the linear portion P1 of the core layer CR has therein not the clad layer CLD1 but the clad layer CLD2. This means that in First Embodiment, in plan view, the clad layer CLD1 covers only the linear portion P1 of the core layer CR and the vicinity thereof (for example, the oozing region of evanescent light). In other words, in First Embodiment, the core layer CR has two separated linear portions P1 formed on the support substrate SUB and two clad layers CLD1 separated from each other cover these two linear portions P1, respectively.

Figure 10:
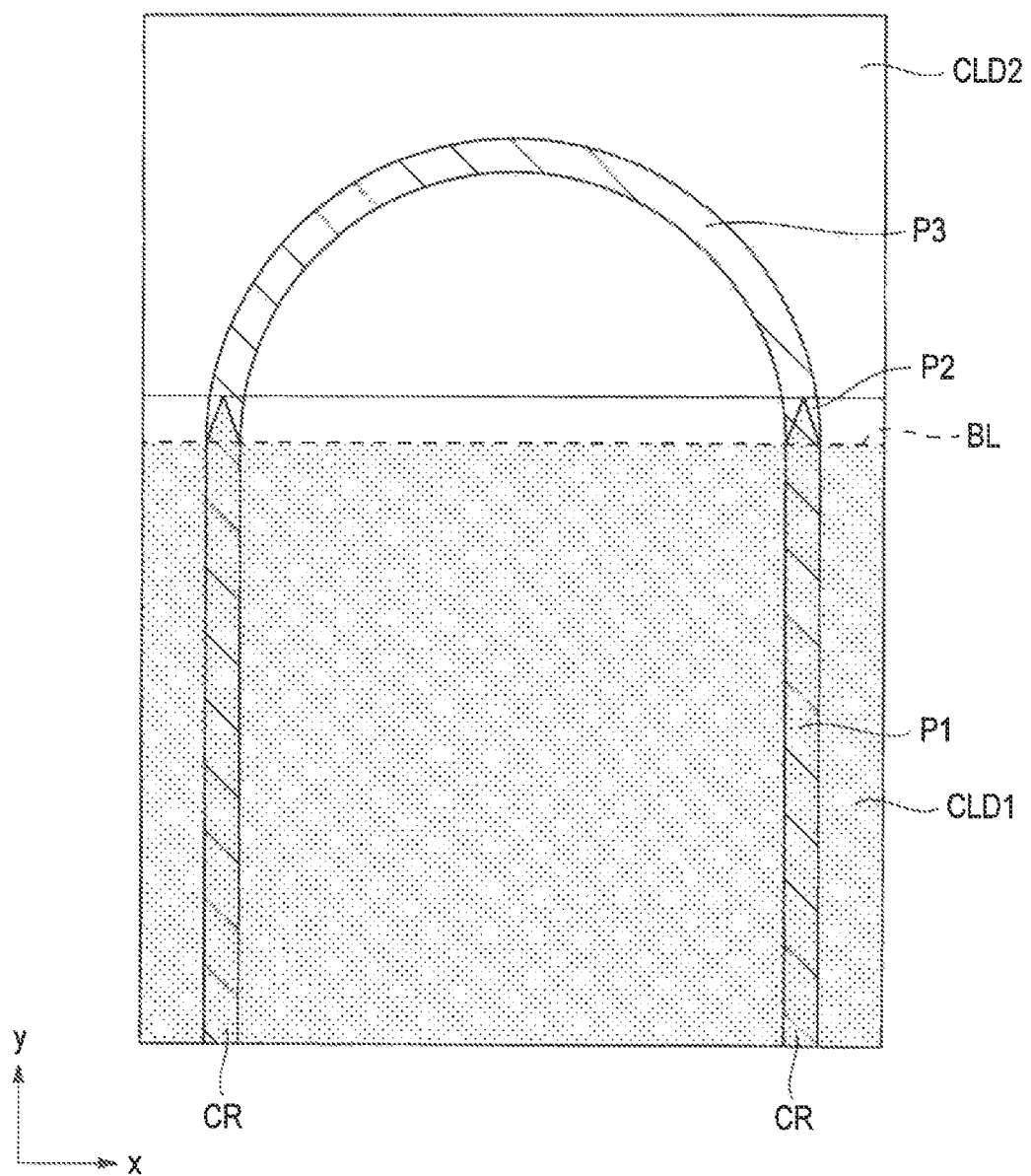
FIG. 10 schematically shows an optical waveguide of Modification Example 2 of First Embodiment.

On the other hand, FIG. 10 shows a schematic configuration of an optical waveguide of Modification Example 2. In the optical waveguide of Modification Example 2 shown in FIG. 10, different from the optical waveguide of First Embodiment shown in FIG. 3, the clad layer CLD1 is formed not only in the region that covers the linear portion P1 of the core layer CR on the side below the boundary line BL in this drawing but also throughout the region below the boundary line BL in this drawing. In short, in Modification Example 2, two linear portions P1 separated from each other are covered with one clad layer CLD1.

Thus, in realizing the technical concept of First Embodiment, not only the layout configuration of the clad layer CLD1 and the clad layer CLD2 in First Embodiment shown in FIG. 3 but also the layout configuration of the clad layer CLD1 and the clad layer CLD2 in Modification Example 2 shown in FIG. 10 can be adopted. In particular, Modification Example 2 shown in FIG. 10 can provide an advantage of facilitating patterning of the clad layer CLD1.

<Method of Manufacturing Optical Waveguide>

Next, a method of manufacturing the semiconductor device including the optical waveguide according to First Embodiment will be described referring to some drawings. In FIGS. 11 to 15 which describe the method of manufacturing the semiconductor device of First Embodiment, the A-A cross-section, the B-B cross-section, the C-C cross-section, and the D-D cross-section shown in FIG. 3 are shown side by side.

Figure 11:
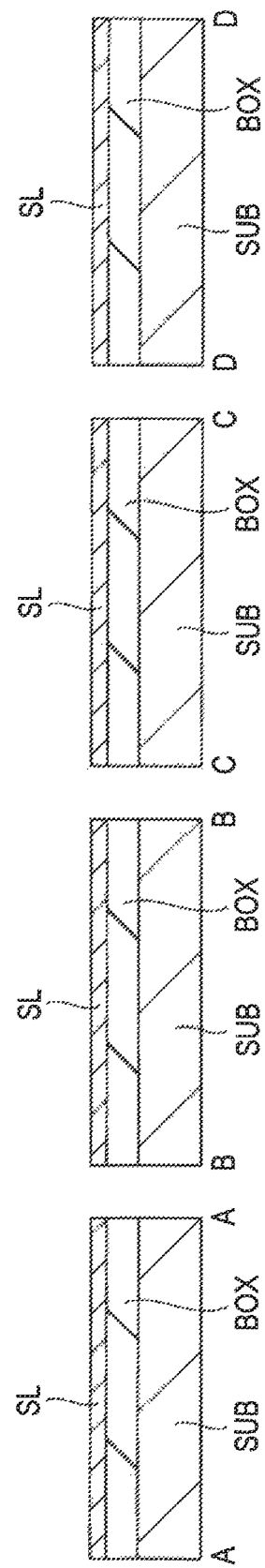
FIG. 11 is a cross-sectional view showing a manufacturing step of the semiconductor device of First Embodiment.

First, as shown in FIG. 11, a SOI substrate is provided. The SOI substrate is comprised of, for example, a support substrate SUB made of silicon, a buried insulating layer BOX made of a silicon oxide film formed on the support substrate SUB, and a silicon layer SL formed on the buried insulating layer BOX.

Figure 12:
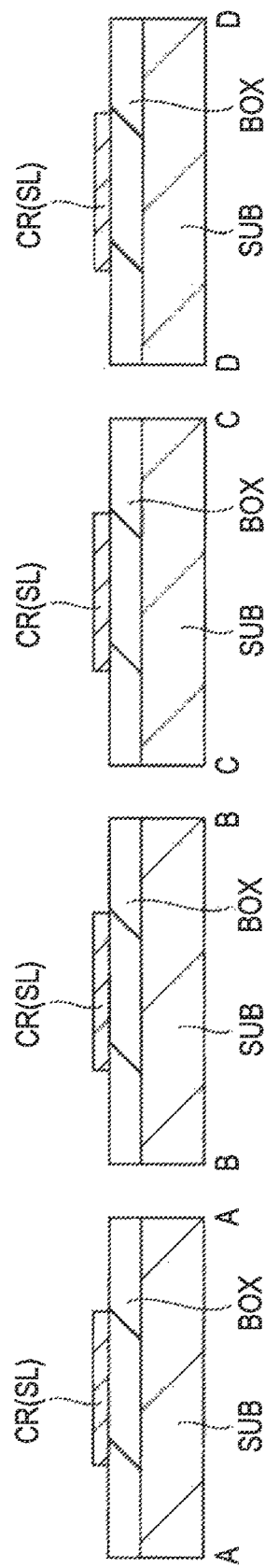
FIG. 12 is a cross-sectional view showing a manufacturing step of the semiconductor device following that of FIG. 11.

Next, as shown in FIG. 12, the silicon layer SL of the SOI substrate is processed using photolithography and etching into a core layer CR. For example, the silicon layer SL configuring the core layer CR has a refractive index of 3.48 and the buried insulating layer BOX configuring a lower clad layer has a refractive index of 1.46.

Figure 13:
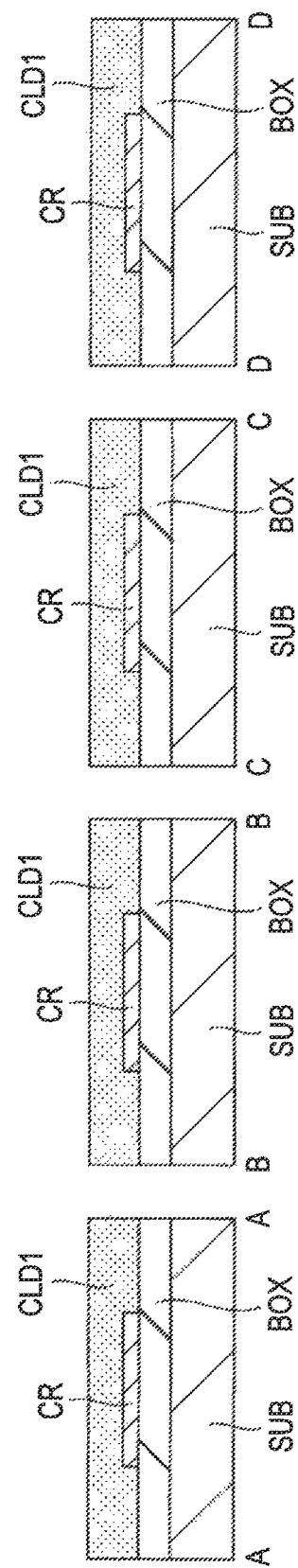
FIG. 13 is a cross-sectional view showing a manufacturing step of the semiconductor device following that of FIG. 12.

Then, as shown in FIG. 13, a clad layer CLD1 made of a silicon oxynitride film (SiON film) is formed using, for example, CVD (chemical vapor deposition). The resulting clad layer CLD1 has, for example, a refractive index of n=1.99 for 1.5-μm wavelength light that propagates in the core layer CR.

Figure 14:
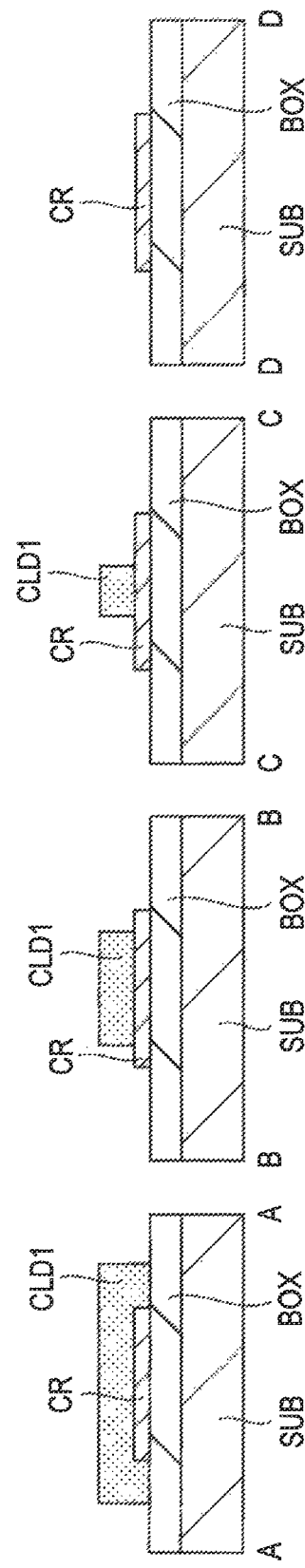
FIG. 14 is a cross-sectional view showing a manufacturing step of the semiconductor device following that of FIG. 13.

Then, as shown in FIG. 14, the clad layer CLD1 is patterned using photolithography and etching. More specifically, in the A-A cross-section of FIG. 14 (corresponding to the cross-section of the linear portion P1 of FIG. 3), the clad layer CLD1 is processed to cover the core layer CR. In the B-B cross-section of FIG. 14 (corresponding to the cross-section of the boundary portion P2 of FIG. 3 on the side of the linear portion P1 with respect to the center), the original clad layer is processed into a clad layer CLD1 having a width smaller than that of the core layer CR. In the C-C cross-section of FIG. 14 (corresponding to the cross-section of the boundary portion P2 of FIG. 3 on the side of the curved portion P3 with respect to the center), the original clad layer is processed into a clad layer CLD1 having a width smaller than that in the B-B cross-section. In the D-D cross-section of FIG. 14 (corresponding to the cross-section of the curved portion P3 of FIG. 3), the clad layer CLD1 is removed.

Figure 15:
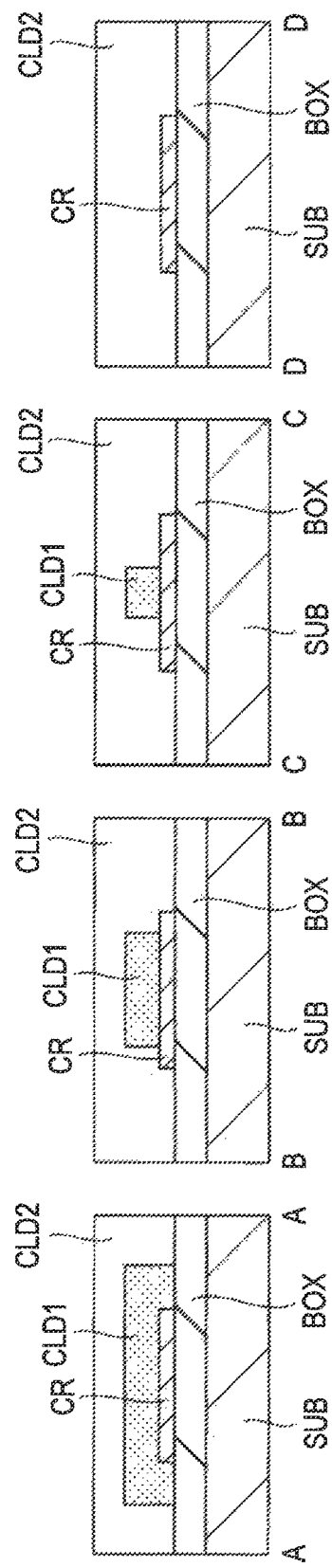
FIG. 15 is a cross-sectional view showing a manufacturing step of the semiconductor device following that of FIG. 14.

Next, as shown in FIG. 15, a clad layer CLD2 made of SiOF is formed on the SOI substrate by using, for example, CVD. The clad layer CLD2 thus obtained has, for example, a refractive index of n=1.43 for 1.5-μm wavelength light that propagates in the core layer CR. In such a manner, the semiconductor device including the optical waveguide according to First Embodiment can be manufactured.

Modification Example 3

Figure 16:
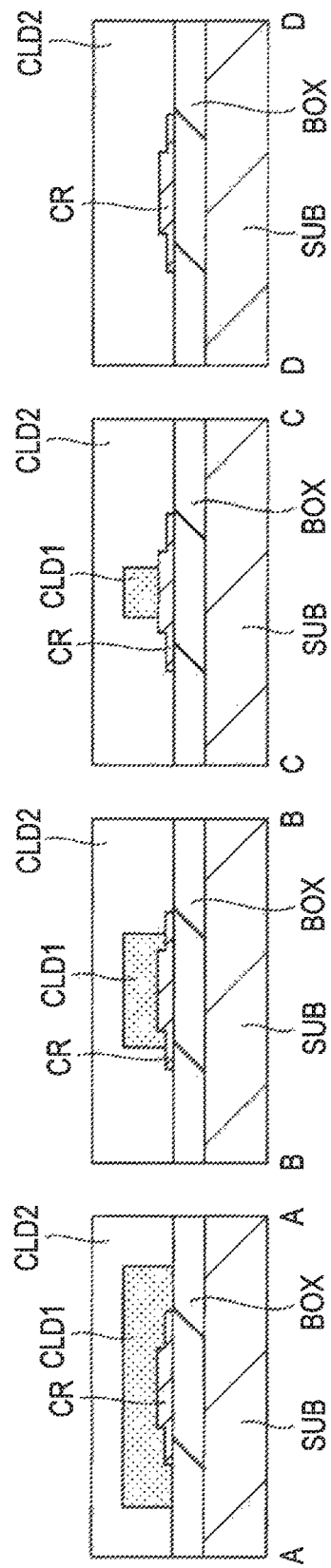
FIG. 16 is a cross-sectional view showing the configuration of an optical waveguide of Modification Example 3 of First Embodiment.

For example, the core layer CR of First Embodiment has a rectangular cross-sectional shape as shown in FIG. 15 and it has such a shape on the assumption that light propagates inside the core layer CR is single mode. The technical concept of First Embodiment is not limited to an optical waveguide for propagating single-mode light but can be used widely for an optical waveguide for propagating multi-mode light. In particular, examples of the cross-sectional shape of the core layer CR for propagating multi-mode light with low loss include a rib shape as shown in FIG. 16. The technical concept of First Embodiment can also be applied even to the core layer CR having a rib shape as shown in FIG. 16.

Modification Example 4

Next, Modification Example 4 of First Embodiment will be described. In First Embodiment, for example, described is an example of the clad layer CLD1 that covers the boundary portion P2 of the core layer CR has a triangle planar shape including a taper shape as shown in FIG. 3. More specifically, as shown in FIG. 3, the first overlapping portion of the boundary portion P2 has a triangle shape protruding to the side of the curved portion P3 in plan view. The technical concept of First Embodiment is not limited to it but can also be applied widely even to the case where the clad layer CLD1 that covers the boundary portion P2 of the core layer CR has various planar shapes.

Figure 17:
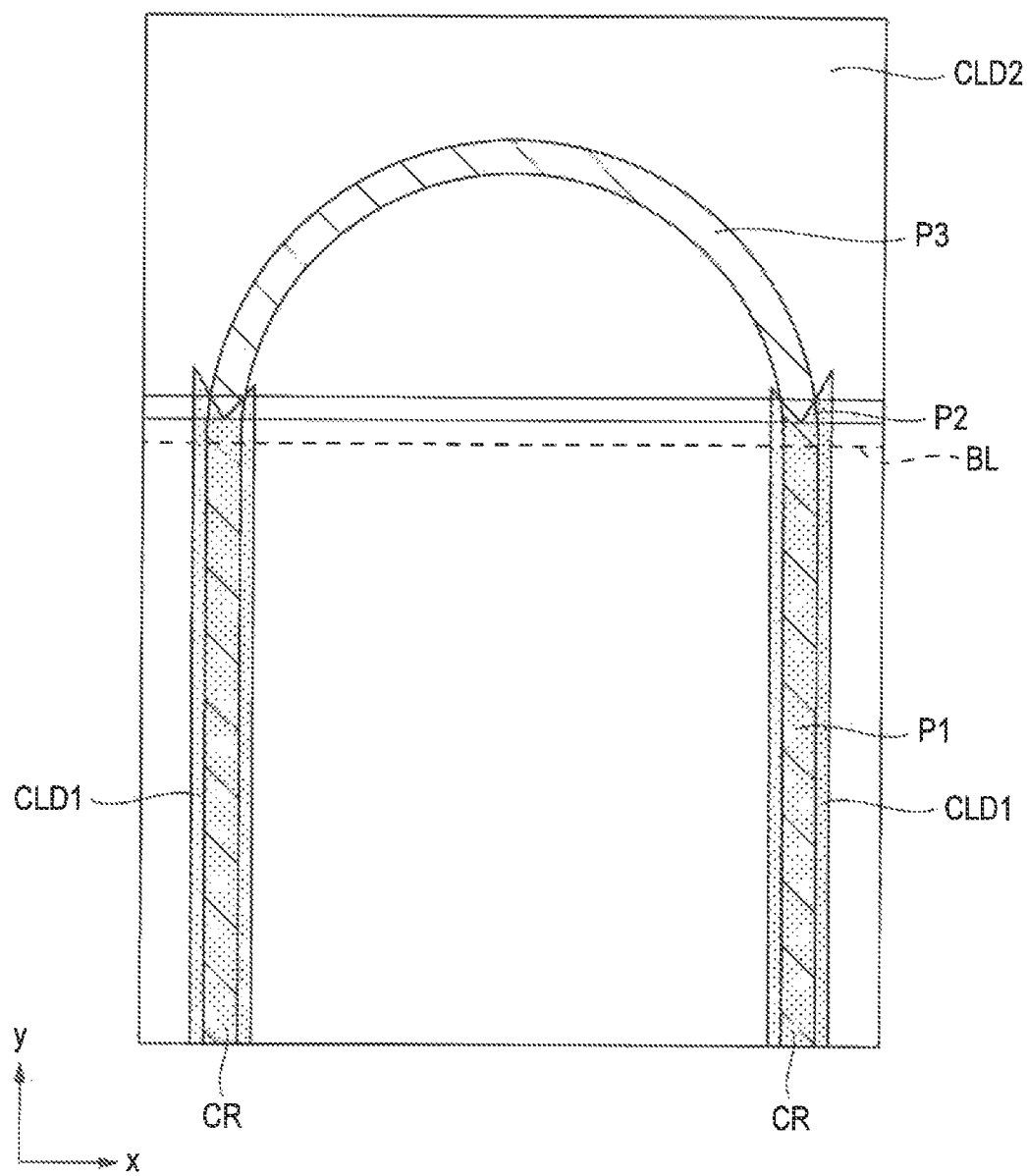
FIG. 17 schematically shows an optical waveguide of Modification Example 4 of First Embodiment.
Figure 18:
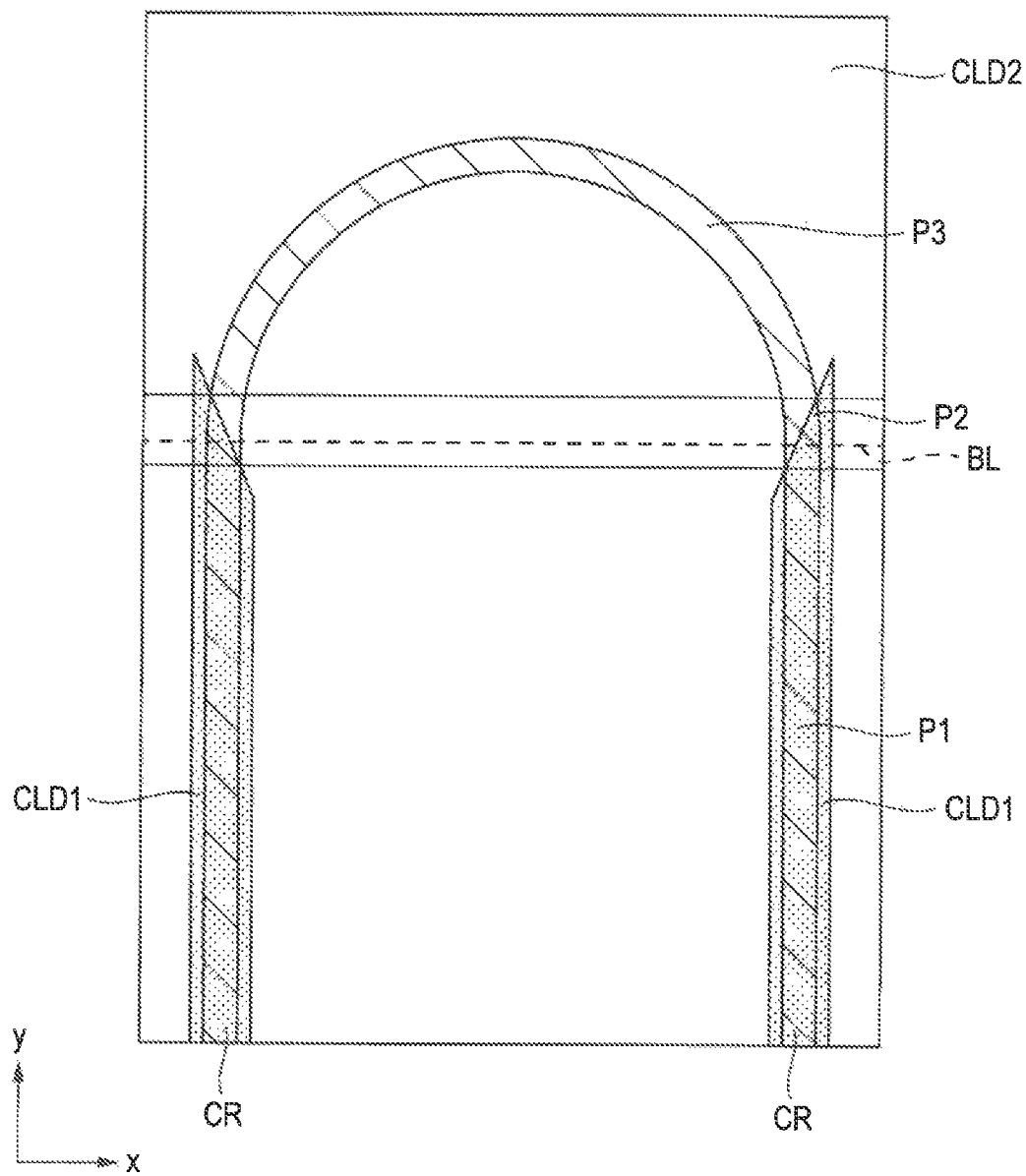
FIG. 18 schematically shows an optical waveguide of Modification Example 4 of First Embodiment.
Figure 19:
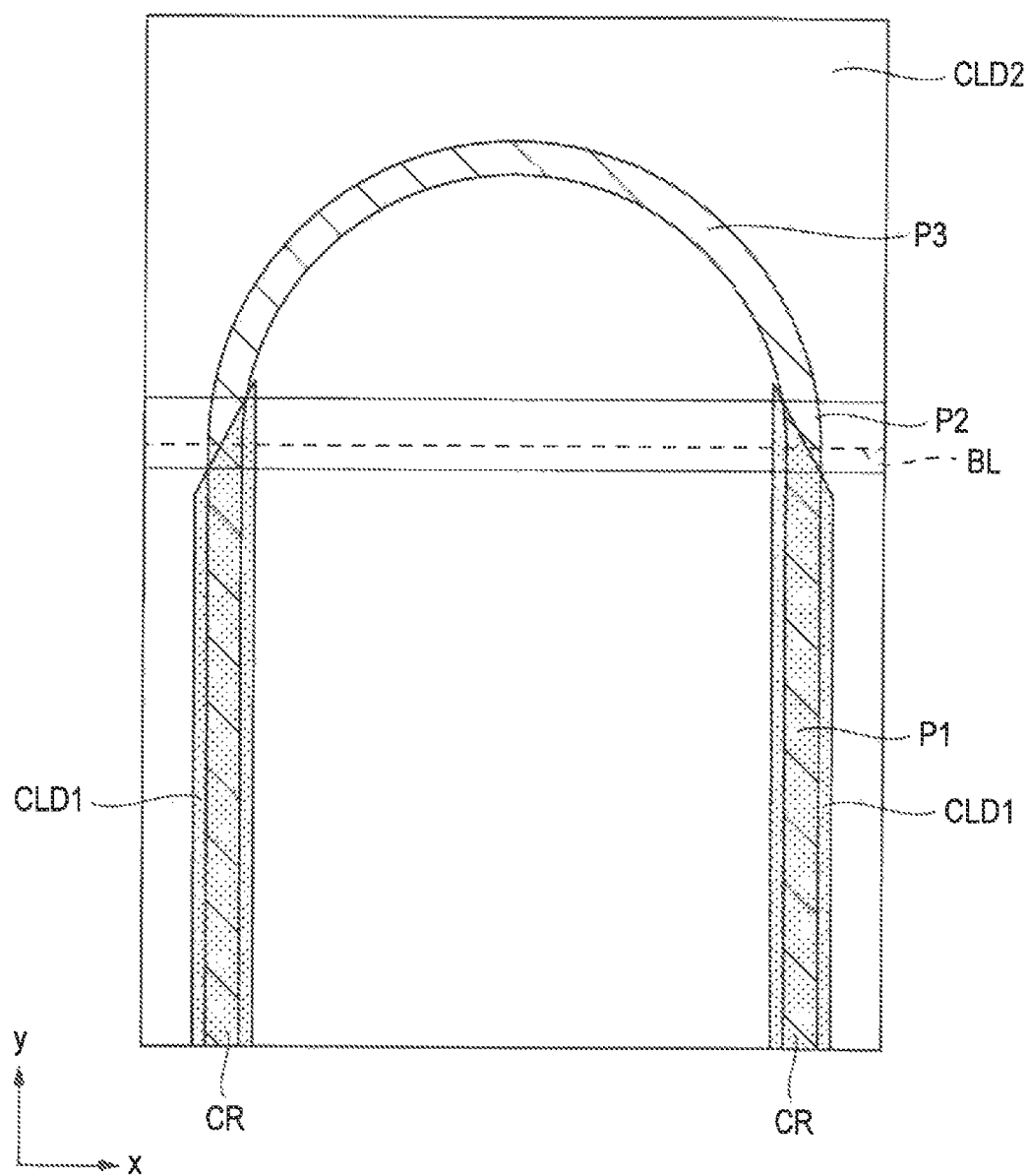
FIG. 19 schematically shows an optical waveguide of Modification Example 4 of First Embodiment.
Figure 20:
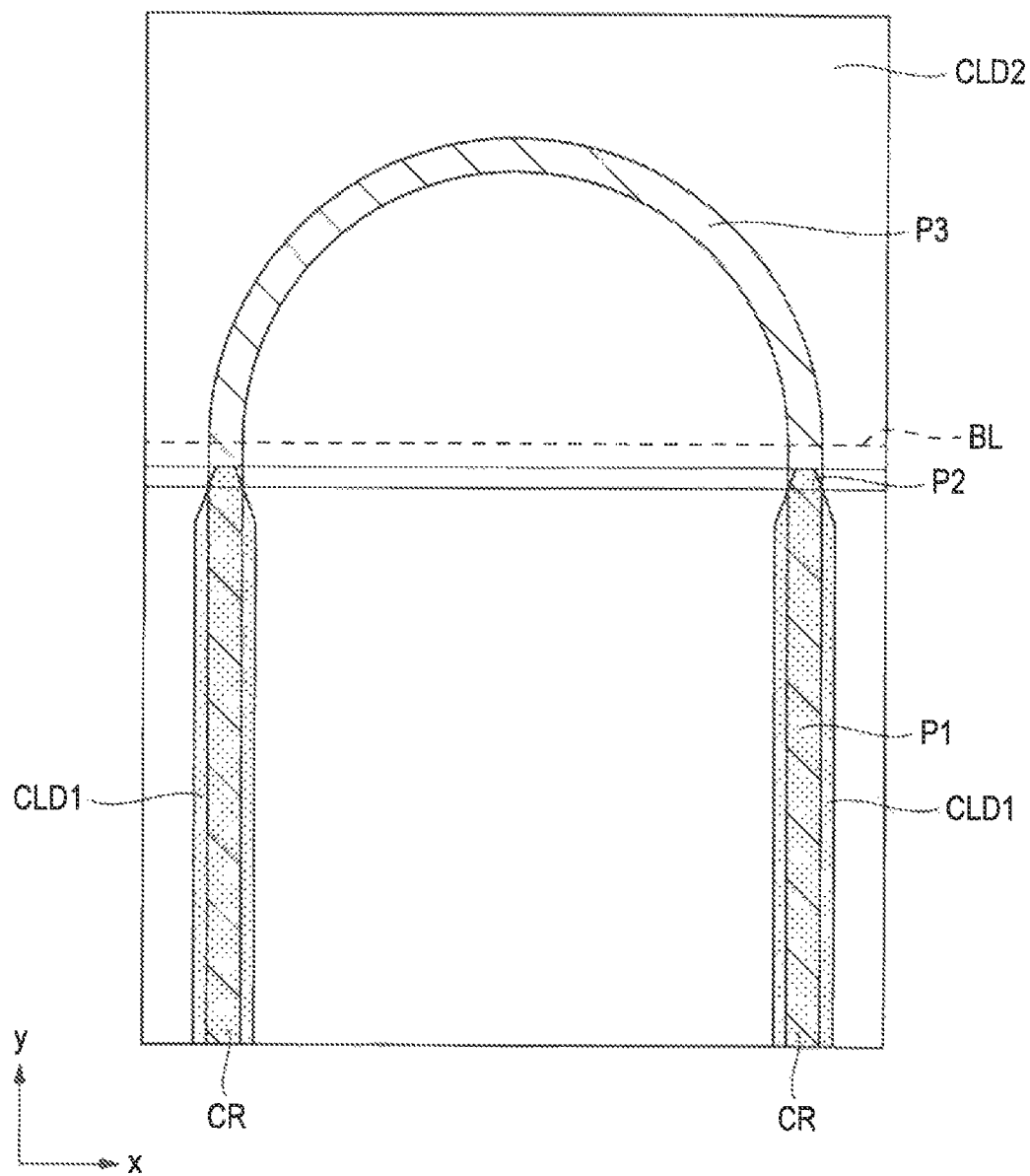
FIG. 20 schematically shows an optical waveguide of Modification Example 4 of First Embodiment.
Figure 21:
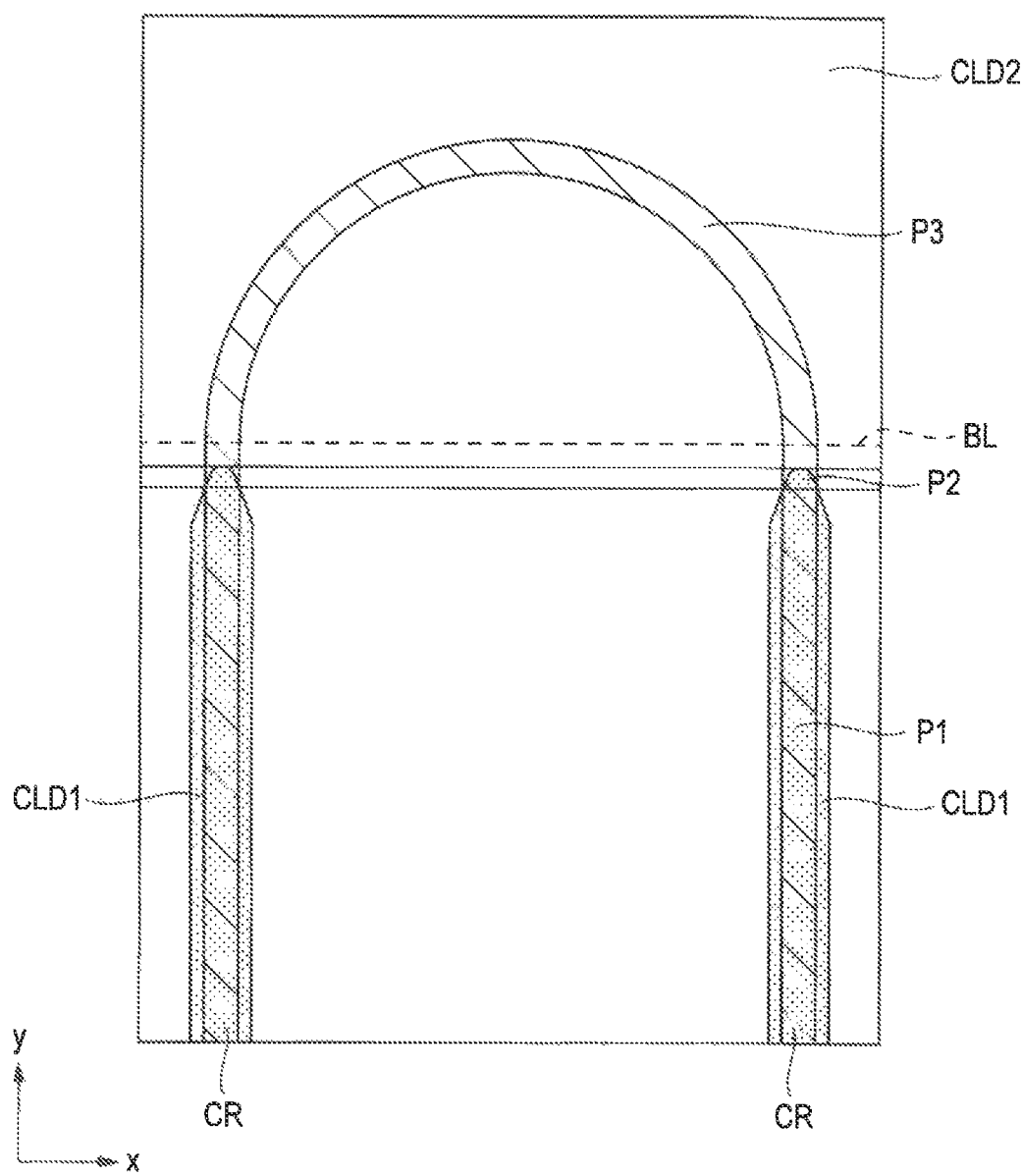
FIG. 21 schematically shows an optical waveguide of Modification Example 4 of First Embodiment.
Figure 22:
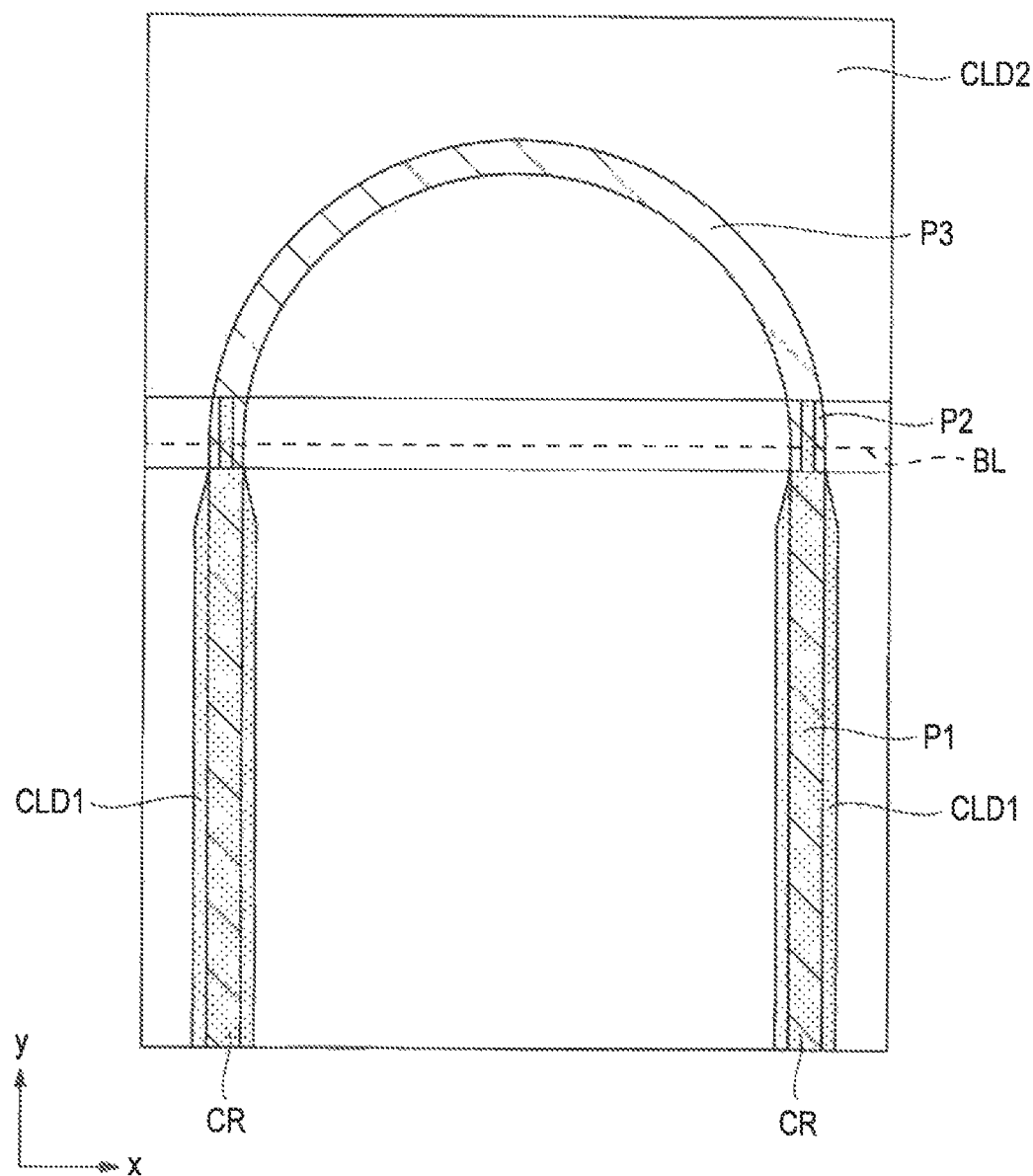
FIG. 22 schematically shows an optical waveguide of Modification Example 4 of First Embodiment.
Figure 23:
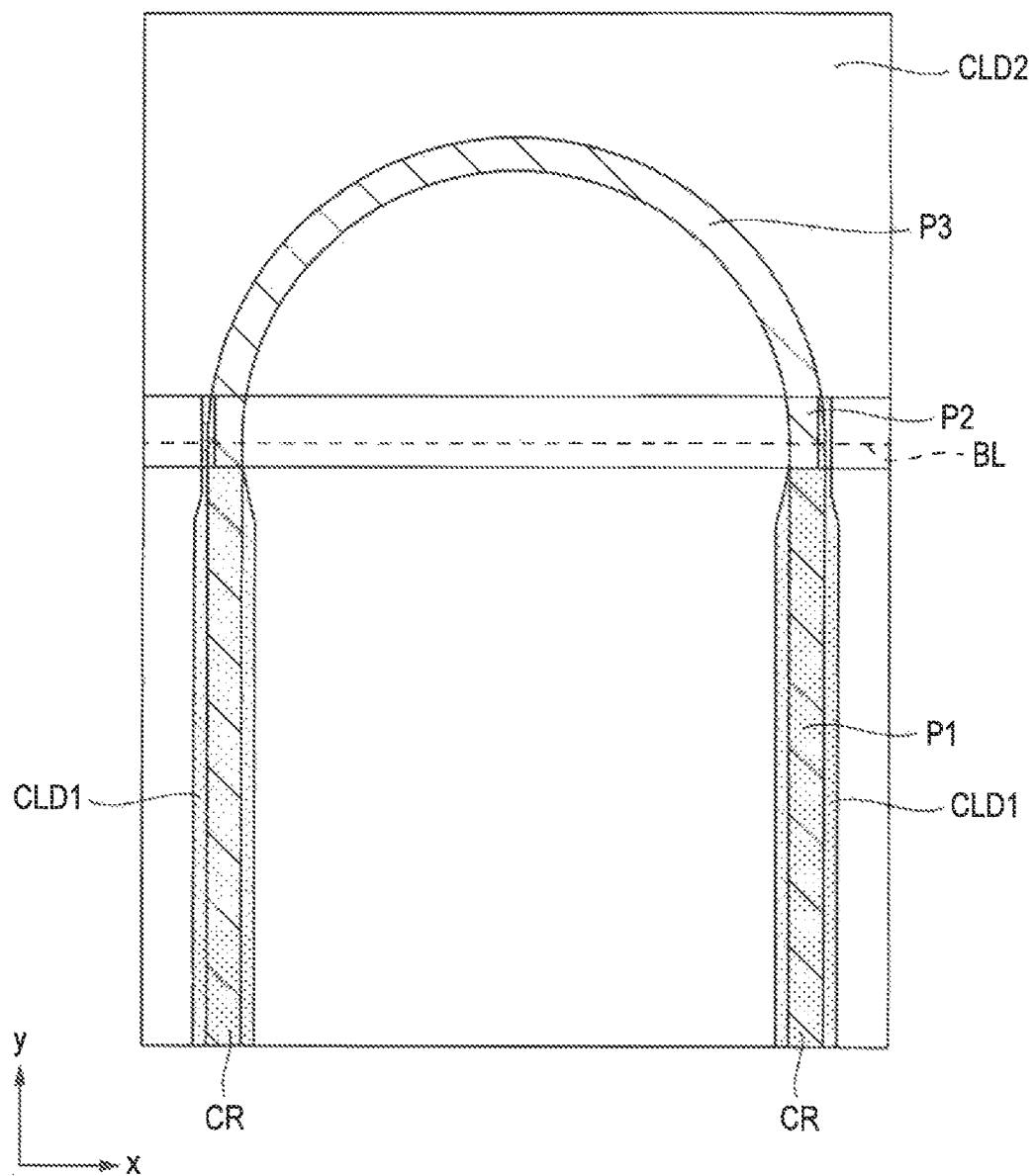
FIG. 23 schematically shows an optical waveguide of Modification Example 4 of First Embodiment.
Figure 24:
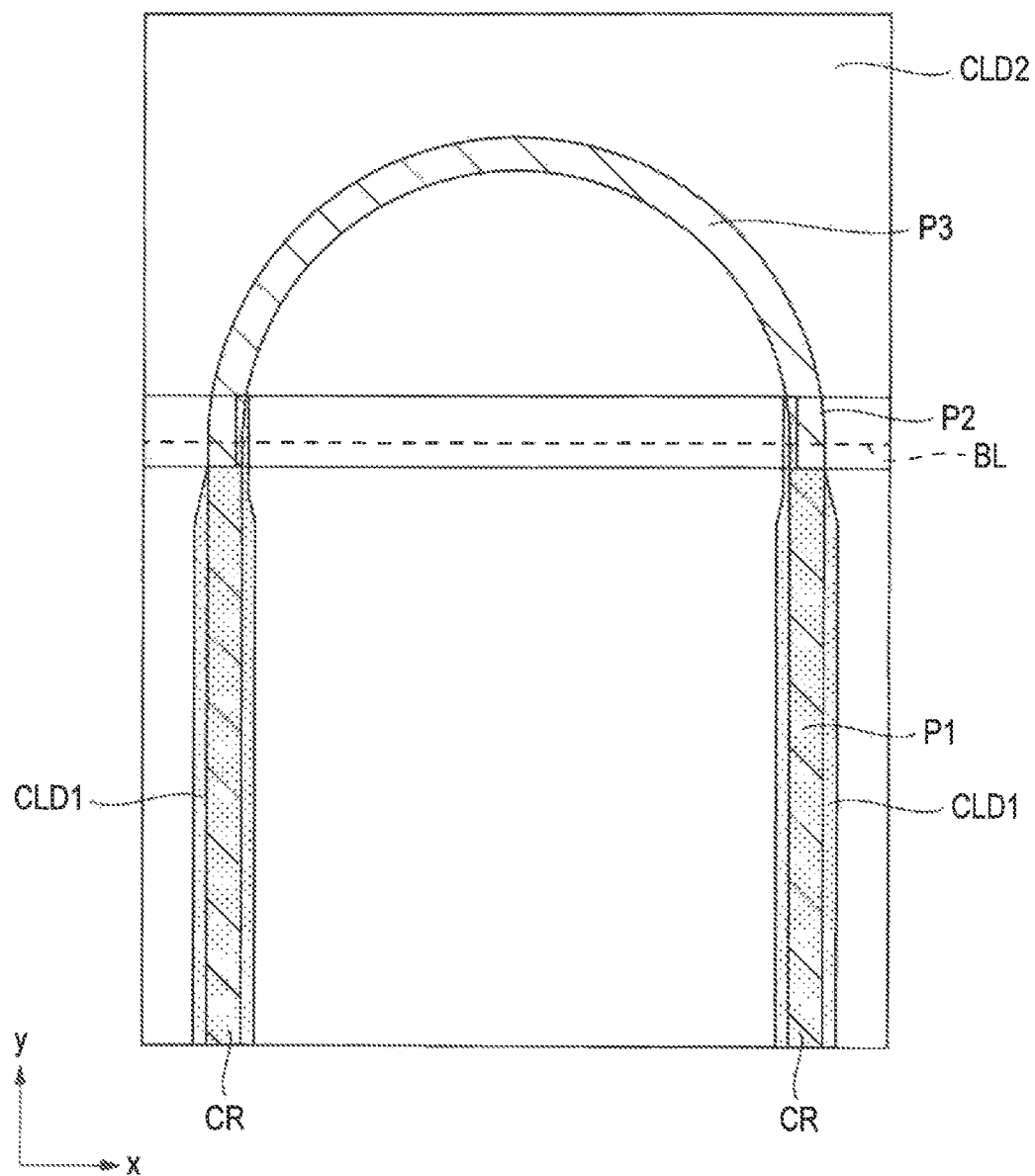
FIG. 24 schematically shows an optical waveguide of Modification Example 4 of First Embodiment.

For example, the technical concept of First Embodiment can also be applied to the case where the clad layer CLD1 that covers the boundary portion P2 of the core layer CR has a serrated planar shape. This means that as shown in FIG. 17, the second overlapping portion of the boundary portion P2 may have a triangle shape protruding to the side of the linear portion P1. The technical concept can also be applied to the case where the clad layer CLD1 that covers the boundary portion P2 of the core layer CR has a knife-like planar shape including a taper shape as shown in FIG. 18 or 19. In other words, the boundary between the clad layer CLD1 and the clad layer CLD2 each contacting with the core layer CR may approach from one side surface to the other side surface of the boundary portion P2 in plan view as going from the linear portion P1 to the curved portion P3. The technical concept of First Embodiment can also be applied to, for example, the case where the clad layer CLD1 that covers the boundary portion P2 of the core layer CR has a trapezoidal planar shape including a taper shape as shown in FIG. 20 or can be applied to, for example, the case where the tip portion of the clad layer CLD1 that covers the boundary portion P2 of the core layer CR has a planar shape including an arc shape as shown in FIG. 21. Further, the technical concept of First Embodiment can also be applied to, for example, the case where the clad layer CLD1 placed on the boundary portion P2 of the core layer CR has a rectangular shape as shown in FIGS. 22 to 24. The base end portion of the rectangular clad layer CLD1 placed on the boundary portion P2 may be placed, in plan view, at the center of the core layer CR in the width direction thereof as shown in FIG. 22 or at the end portion of the core layer CR in the width direction thereof as shown in FIG. 23 or 24.

Thus, the technical concept of First Embodiment can be applied widely to the configuration that realizes, in the cross-section orthogonal to the extending direction of the boundary portion P2, the concept of causing both the clad layer CLD1 and the clad layer CLD2 that cover the boundary portion P2 to exist so as to make a ratio of the clad layer CLD2 to the clad layer CLD1 a finite value more than 0. More specifically, the technical concept of First Embodiment can be applied widely to the case where the clad layer CLD1 that covers the boundary portion P2 of the core layer CR has a planar shape including a rugged shape, an arc shape, or a rectangular shape.

Second Embodiment

The technical concept of Second Embodiment is that the refractive index of a buried insulating layer located below the linear portion of the core layer is differentiated from the refractive index of the buried insulating layer located below the curved portion of the core layer to reduce the optical loss at the linear portion of the core layer while satisfying the total reflection condition at the curved portion of the core layer.

More specifically, Second Embodiment realizes the technical concept of Second Embodiment by introducing an impurity for changing the refractive index inside the buried insulating layer made of, for example, a silicon oxide film.

Figure 25:
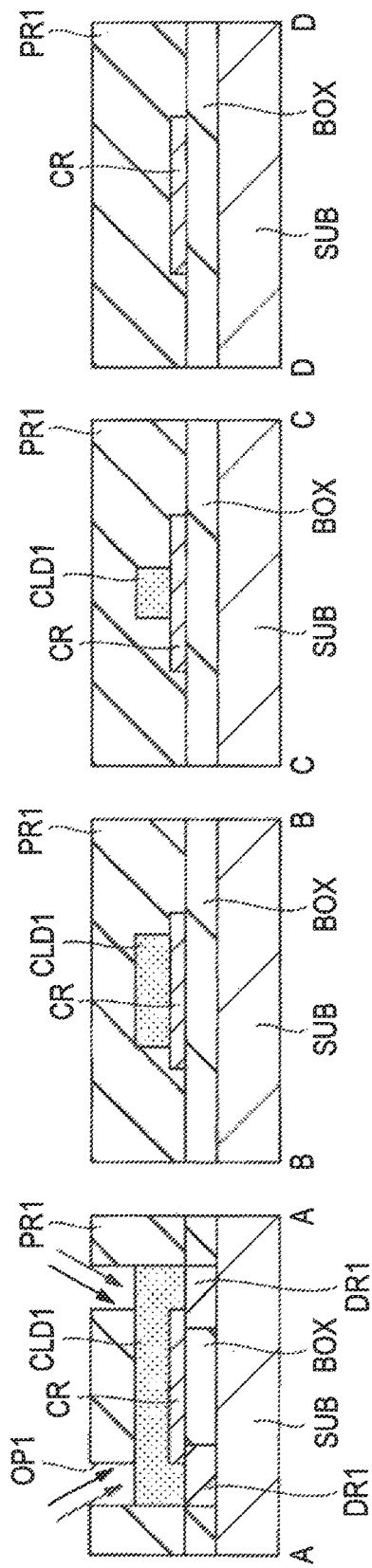
FIG. 25 is a cross-sectional view showing a manufacturing step of a semiconductor device of Second Embodiment.
Figure 26:
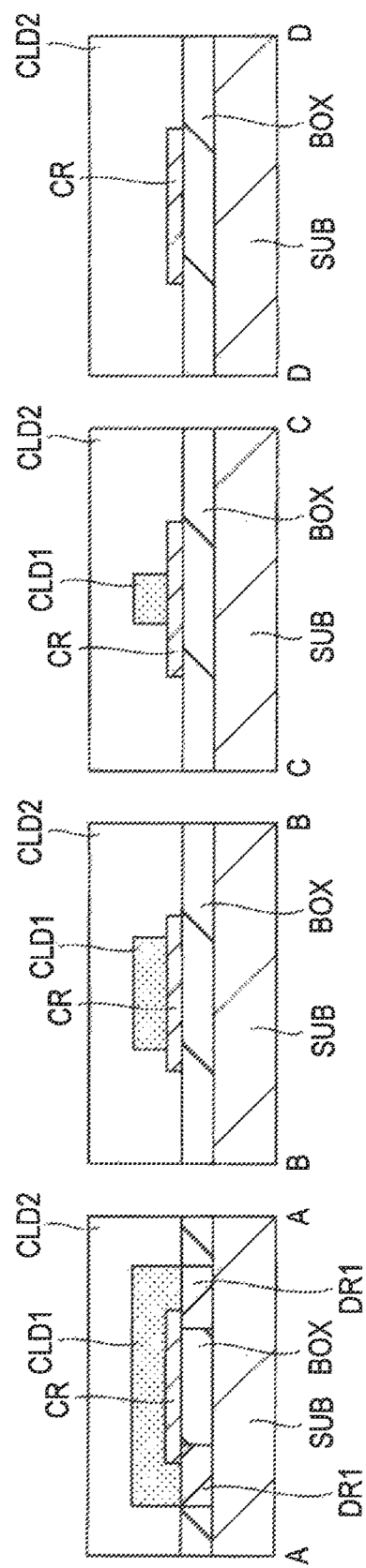
FIG. 26 is a cross-sectional view showing a manufacturing step of the semiconductor device following that of FIG. 25.
Figure 27:
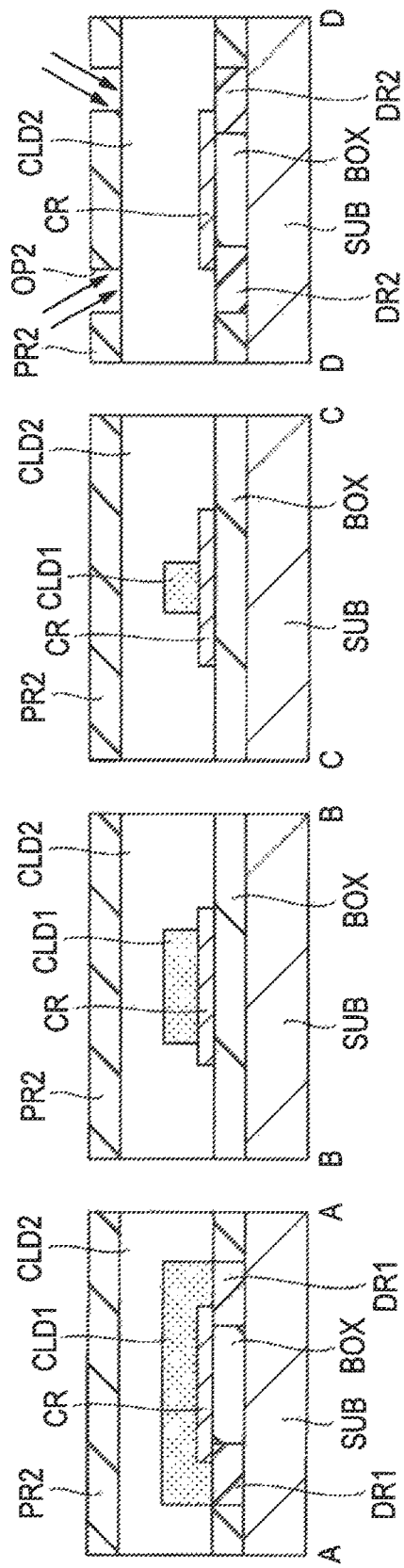
FIG. 27 is a cross-sectional view showing a manufacturing step of the semiconductor device following that of FIG. 26.

A method of manufacturing the optical waveguide of Second Embodiment will hereinafter be described referring to FIGS. 25 to 27. In FIGS. 25 to 27, the A-A cross-section, the B-B cross-section, the C-C cross-section, and the D-D cross-section of FIG. 3 are arranged side by side.

First, the manufacturing method of this embodiment is similar to that of the optical waveguide of First Embodiment until the steps shown in FIGS. 11 to 14. Next, as shown in FIG. 25, after application of a resist film PR1 on the SOI substrate, an opening portion OP1 is formed by photolithography in the resist film PR1 formed in the A-A cross-section (corresponding to the linear portion of the core layer CR). Then, by ion implantation with the resist film PR1 having therein the opening portion OP1 as a mask, an impurity for increasing a refractive index is introduced into the buried insulating layer BOX formed in the A-A cross-section (corresponding to the linear portion of the core layer CR). More specifically, an impurity made of titanium oxide, germanium oxide, aluminum oxide, phosphorus oxide or the like is introduced into the buried insulating layer BOX. By this introduction, an impurity introduced region DR1 is formed in the buried insulating layer BOX formed in the A-A cross-section (corresponding to the linear portion of the core layer CR). More specifically, the buried insulating layer BOX has an overlapping portion with the core layer CR in plan view and a non-overlapping portion with the core layer CR in plan view. In Second Embodiment, the impurity buried region DR1 is formed by introducing an impurity for increasing the refractive index of the buried insulating layer BOX in both a part of the overlapping portion and a part of the non-overlapping portion (a portion adjacent to the part of the overlapping portion). As a result, the buried insulating layer BOX formed in the A-A cross-section (corresponding to the linear portion of the core layer CR) has an increased refractive index. This results in decrease in the difference in refractive index between the core layer CR and the buried insulating layer BOX functioning as a clad layer in the A-A cross-section (corresponding to the linear portion of the core layer CR) so that the oozing distance of evanescent light to the buried insulating layer BOX can be reduced. According to Second Embodiment, therefore, the optical loss at the linear portion of the core layer CR can be reduced further. In Second Embodiment, for example, as shown in FIG. 25, ion implantation into the buried insulating layer BOX is performed while covering the core layer CR with the clad layer CLD1. This makes it possible to prevent damage by ion implantation from affecting the core layer CR. The core layer CR therefore can still have low optical loss even if ion implantation is used.

After removal of the resist film PR1, a clad layer CLD2 made of an SiOF film is formed on the SOI substrate, for example, by CVD as shown in FIG. 26. Then, as shown in FIG. 27, after application of a resist film PR2 onto the clad layer CLD2, an opening portion OP2 is formed by photolithography in the resist film PR2 formed in the D-D cross-section (corresponding to the curved portion of the core layer). Then, by ion implantation with the resist film PR2 having the opening portion OP2 therein as a mask, an impurity for reducing a refractive index is introduced into the buried insulating layer BOX formed in the D-D cross-section (corresponding to the curved portion of the core layer CR). More specifically, an impurity made of boron oxide, fluorine, or the like is introduced into the buried insulating layer BOX. By this introduction, an impurity introduced region DR2 is formed in the buried insulating layer BOX formed in the D-D cross-section (corresponding to the curved portion of the core layer CR). More specifically, the buried insulating layer BOX has an overlapping portion with the core layer CR in plan view and a non-overlapping portion with the core layer CR in plan view. In Second Embodiment, the impurity for reducing the refractive index of the buried insulating layer BOX is introduced into both a part of the overlapping portion and a part of the non-overlapping portion (adjacent to the part of the overlapping portion) to form the impurity introduced region DR2. As a result, the buried insulating layer BOX formed in the D-D cross-section (corresponding to the curved portion of the core layer CR) has a reduced refractive index. This results in an increase in a difference in refractive index between the core layer CR and the buried insulating layer BOX functioning as a clad layer in the D-D cross-section (corresponding to the curved portion of the core layer CR) so that regardless of reduction in radius of curvature at the curved portion of the core layer CR, the total reflection condition can be satisfied. Without departing from the total reflection condition, the curved portion of the core layer CR can have a reduced radius of curvature, which allows high integration of the optical waveguides of Second Embodiment. In Second Embodiment, for example, as shown in FIG. 27, ion implantation into the buried insulating layer BOX is performed while covering the core layer CR with the clad layer CLD2. This makes it possible to prevent damage by ion implantation from affecting the core layer CR. The core layer therefore can still have low optical loss even if ion implantation is used.

As described above, the optical waveguide of Second Embodiment can be manufactured. In particular, the optical waveguide of Second Embodiment has a characteristic that the refractive index of the buried insulating layer BOX formed right below the linear portion of the core layer CR (A-A cross-section) is greater than the refractive index of the buried insulating layer BOX formed right below the curved portion (D-D cross-section) of the core layer CR. Further, the optical waveguide of Second Embodiment having both the above-described characteristics of First Embodiment and Second Embodiment is superior to the optical waveguide of First Embodiment in satisfying both reduction in optical loss and high integration.

Modification Example

In Second Embodiment, described was a technical concept of introducing an impurity for changing the refractive index of the buried insulating layer BOX into the buried insulating layer BOX having an overlapping portion with the core layer CR in plan view and a non-overlapping portion with the core layer CR in plan view, more specifically into both a part of the overlapping portion and a part of the non-overlapping portion. From the standpoint of effectively satisfying both reduction in optical loss and high integration, it is, in fact, desired to introduce a refractive index-changing impurity into the buried insulating layer BOX formed in a region right below the core layer CR. In the present modification example, therefore, a technical concept of introducing a refractive index-changing impurity into the buried insulating layer BOX formed in a region right below the core layer CR.

Figure 28:
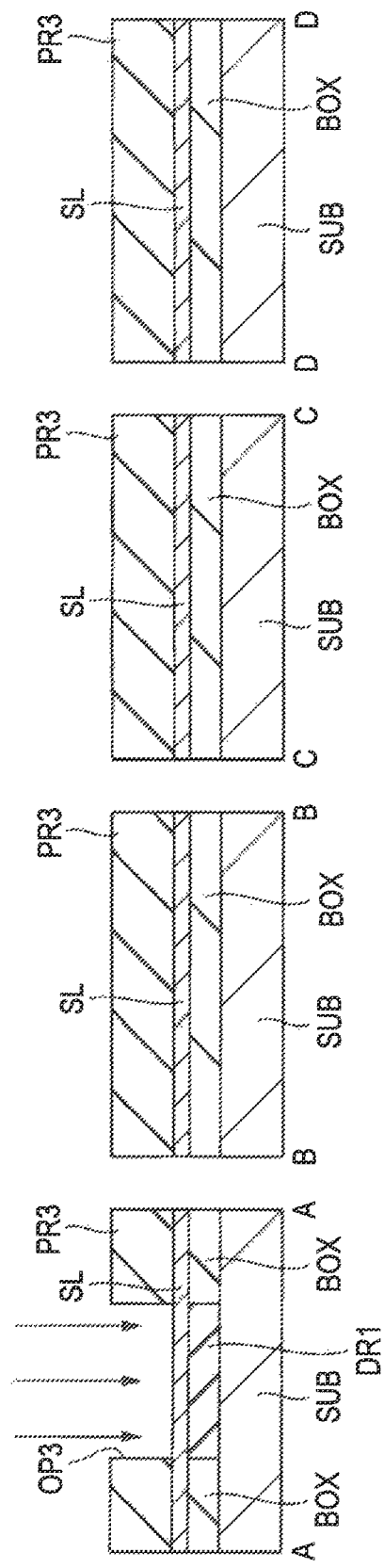
FIG. 28 is a cross-sectional view showing a manufacturing step of a semiconductor device of a modification example of Second Embodiment.
Figure 29:
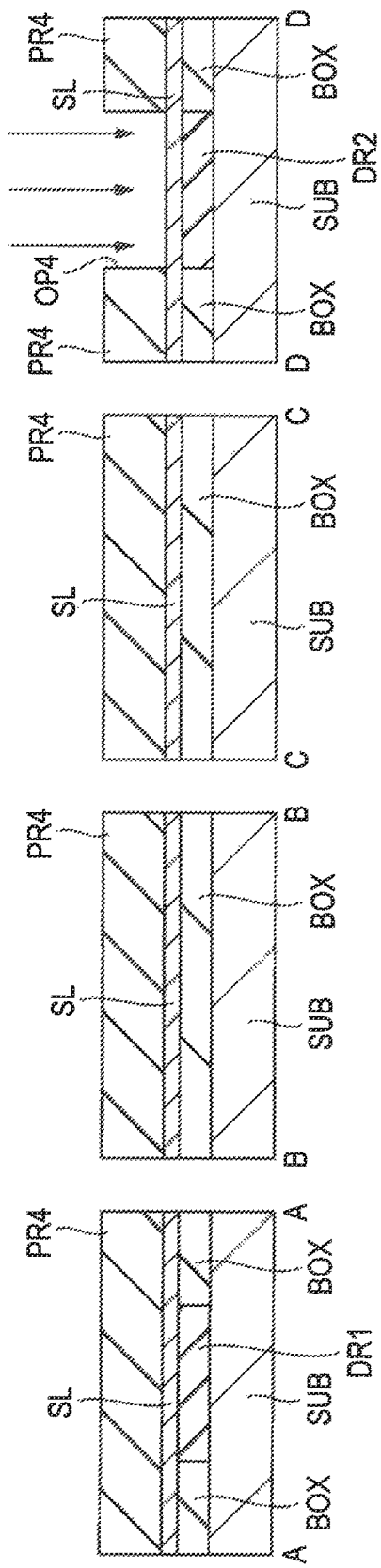
FIG. 29 is a cross-sectional view showing a manufacturing step of the semiconductor device following that of FIG. 28.

A method of manufacturing an optical waveguide of the present modification example will hereinafter be described referring to FIGS. 28 and 29. In each of FIGS. 28 and 29, the A-A cross-section, the B-B cross-section, the C-C cross-section, and the D-D cross-section in FIG. 3 are arranged side by side.

First, as shown in FIG. 11, a SOI substrate is provided. Next, as shown in FIG. 28, after application of a resist film PR3 onto the silicon layer SL of the SOI substrate, an opening portion OP3 is formed in the resist film PR3 formed in the A-A cross-section (corresponding to the linear portion of the core layer) by photolithography. Then, by ion implantation with the resist film PR3 having therein the opening portion OP3 as a mask, a refractive index-increasing impurity is introduced into the buried insulating layer BOX formed in the A-A cross-section (corresponding to the linear portion of the core layer CR). More specifically, an impurity made of titanium oxide, germanium oxide, aluminum oxide, phosphorus oxide or the like is introduced into the buried insulating layer BOX. By this introduction, an impurity introduced region DR1 is formed in the buried insulating layer BOX formed in the A-A cross-section (corresponding to the linear portion of the core layer CR).

More specifically, the buried insulating layer BOX has an overlapping portion with the core layer CR in plan view and a non-overlapping portion with the core layer CR in plan view. In the present modification example, an impurity for increasing the refractive index of the buried insulating layer BOX is introduced into the overlapping portion to form an impurity introduced region DR1. As a result, the buried insulating layer BOX formed in the A-A cross-section (corresponding to the linear portion of the core layer CR) has an increased refractive index. This leads to a decrease in refractive index difference between the core layer CR and the buried insulating layer BOX functioning as a clad layer in the A-A cross-section (corresponding to the linear portion of the core layer CR) so that an oozing distance of evanescent light into the buried insulating layer BOX can be shortened. The present modification example therefore can reduce the optical loss at the linear portion of the core layer CR.

Then, the resist film PR3 used for forming the opening portion OP3 is removed. As shown in FIG. 29, after application of a resist film PR4 onto the silicon layer SL of the SOI substrate, an opening portion OP4 is formed by photolithography in the resist film PR4 formed in the D-D cross-section (corresponding to the curved portion of the core layer). Then, by ion implantation with the resist film PR4 having therein the opening portion OP4 as a mask, a refractive index-reducing impurity is introduced into the buried insulating layer BOX formed in the D-D cross-section (corresponding to the curved portion of the core layer CR). More specifically, an impurity made of boron oxide, fluorine, or the like is introduced into the buried insulating layer BOX. By this introduction, an impurity introduced region DR2 is formed in the buried insulating layer BOX formed in the D-D cross-section (corresponding to the curved portion of the core layer CR). More specifically, the buried insulating layer BOX has an overlapping portion with the core layer CR in plan view and a non-overlapping portion with the core layer CR in plan view. In the present modification example, the impurity buried region DR2 is formed by introducing the impurity for reducing the refractive index of the buried insulating layer BOX in the overlapping portion. As a result, the buried insulating layer BOX formed in the D-D cross-section (corresponding to the curved portion of the core layer CR) has a reduced refractive index. This results in an increase in refractive index difference between the core layer CR and the buried insulating layer BOX functioning as a clad layer in the D-D cross-section (corresponding to the curved portion of the core layer CR) so that regardless of reduction in the radius of curvature of the curved portion of the core layer CR, the total reflection condition can be satisfied. Without departing from the total reflection condition, therefore, the curved portion of the core layer CR can have a reduced radius of curvature, which allows high integration of the optical waveguides of Second Embodiment. Steps thereafter are almost similar to those of First Embodiment. In such a manner, the optical waveguide of the present modification example can be manufactured.

Third Embodiment

The basic concept of First Embodiment is that discontinuity in refractive index between the first clad layer and the second clad layer is mitigated on the premise that the refractive index of the first clad layer covering the linear portion of the core layer is differentiated from the refractive index of the second clad layer covering the curved portion of the core layer.

In Third Embodiment, the basic concept of First Embodiment is realized by introducing an impurity for reducing the refractive index of the clad layer CLD1 into the clad layer CLD1 that covers the boundary portion P2 of the core layer CR.

Figure 30:
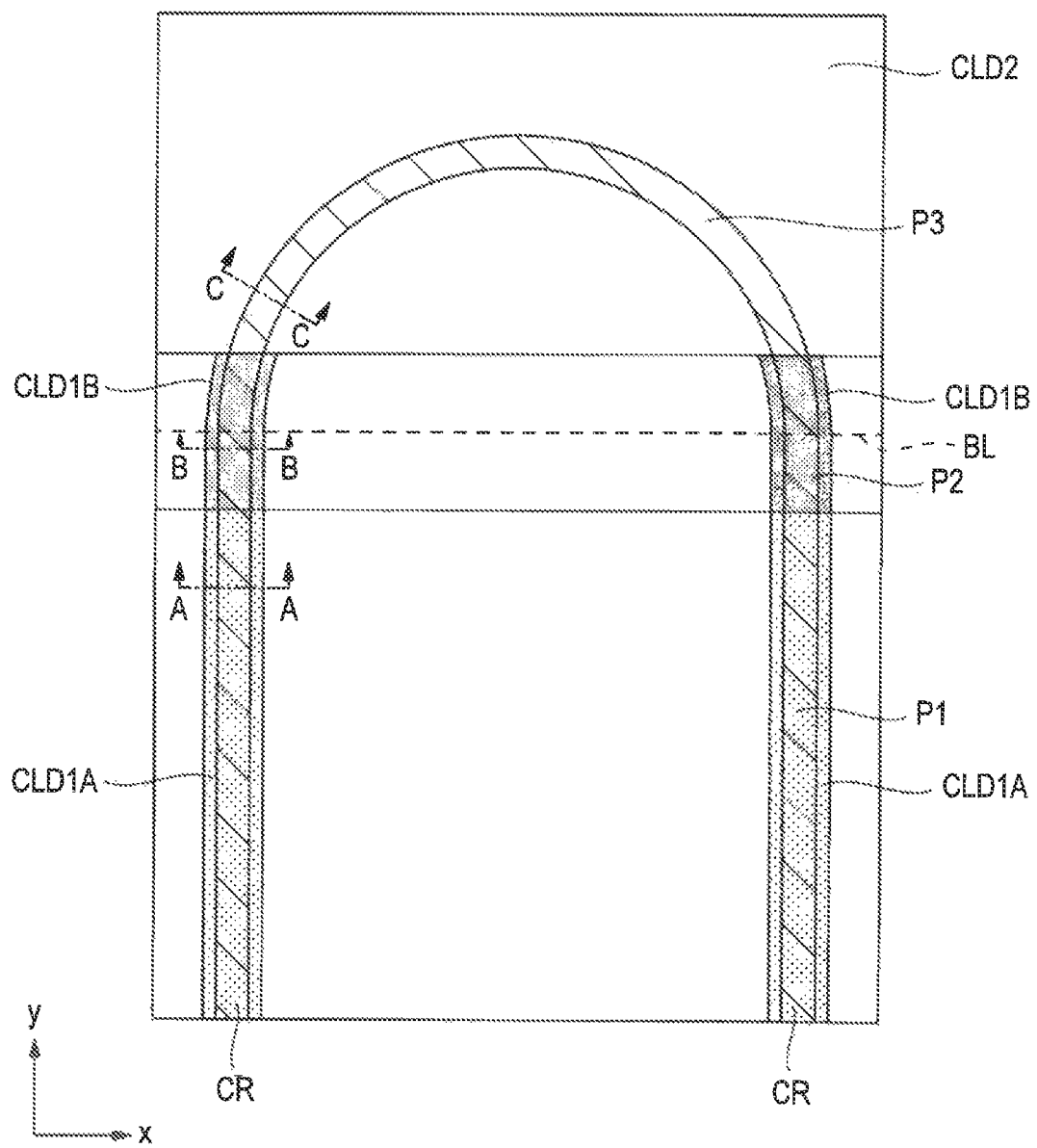
FIG. 30 shows schematic configuration of an optical waveguide of Third Embodiment.
Figure 31:
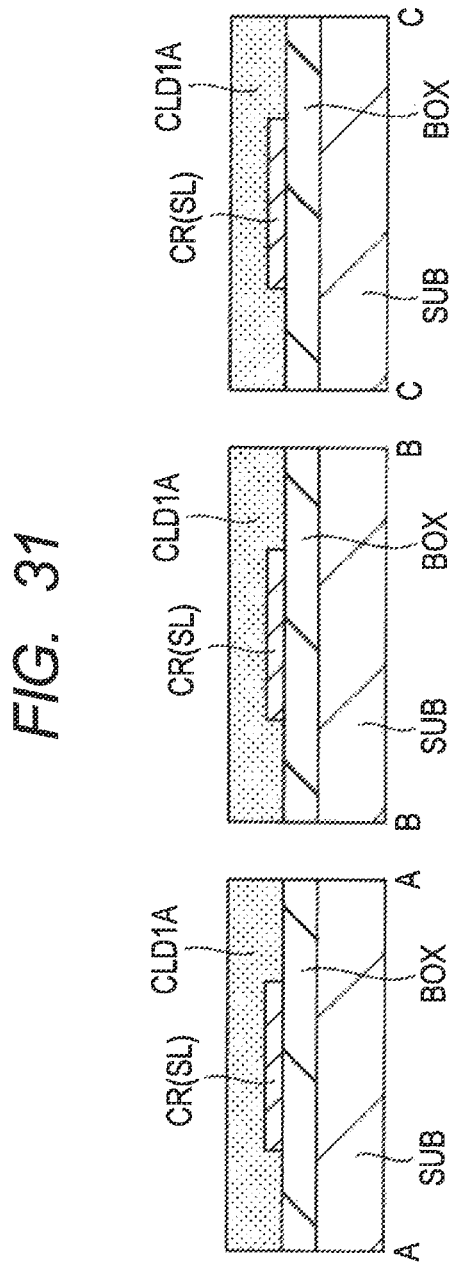
FIG. 31 is a cross-sectional view showing a manufacturing step of a semiconductor device of Third Embodiment.

The schematic configuration of the optical waveguide of Third Embodiment will hereinafter be described. FIG. 30 shows the schematic configuration of the optical waveguide of Third Embodiment. In FIG. 30, the optical waveguide of Third Embodiment has a core layer CR. This core layer CR has a linear portion P1 extending in the y direction (first direction), a curved portion P3 having a finite radius of curvature, and a boundary portion P2 sandwiched between the linear portion P1 and the curved portion P3. In Third Embodiment, the linear portion P1 of the core layer CR is covered with a clad layer CLD1A. The boundary portion P2 of the core layer CR is covered with a clad layer CLD1B formed by introducing a refractive index-reducing impurity into the clad layer CLD1A. Further, the curved portion P3 of the core layer CR is covered with the clad layer CLD2. At this time, the clad layer CLD1B is configured to have a refractive index lower than that of the clad layer CLD1A and higher than that of the clad layer CLD2. According to the optical waveguide of Third Embodiment, the boundary portion P2 of the core layer CR covered with the clad layer CLD1B having a refractive index lower than that of the clad layer CLD1A and higher than that of the clad layer CLD2 is provided between the clad layer CLD1A that covers the linear portion P1 of the core layer CR and the clad layer CLD2 that covers the curved portion P3 of the core layer CR. As a result, in the optical waveguide of Third Embodiment, the discontinuity in refractive index between the clad layer CLD1A and the clad layer CLD2 is mitigated. This means that in Third Embodiment, the basic concept of First Embodiment is realized by a configuration different from that of First Embodiment. Third Embodiment can therefore provide an optical waveguide capable of satisfying both low optical loss and high integration.

A method of manufacturing the optical waveguide of Third Embodiment will hereinafter be described referring to FIGS. 31 to 34. In each of FIGS. 31 to 34, the A-A cross-section, the B-B cross-section, and the C-C cross-section of FIG. 30 are arranged side by side.

First, a clad layer CLD1A made of a silicon oxynitride film (SiON film) is formed using, for example, CVD to cover a core layer CR formed by processing a silicon layer SL of a SOI substrate.

Figure 32:
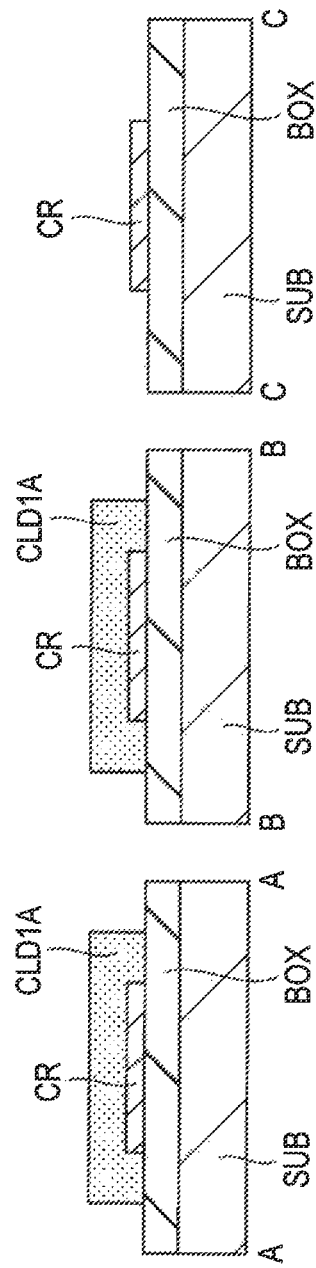
FIG. 32 is a cross-sectional view showing a manufacturing step of the semiconductor device following that of FIG. 31.

Next, as shown in FIG. 32, photolithography and etching are used to process the clad layer CLD1A formed in the A-A cross-section (corresponding to the linear portion P1 of the core layer) and the B-B cross-section (corresponding to the boundary portion P2 of the core layer CR) and at the same time, remove the clad layer CLD1A formed in the C-C cross-section (corresponding to the curved portion P3 of the core layer CR).

Figure 33:
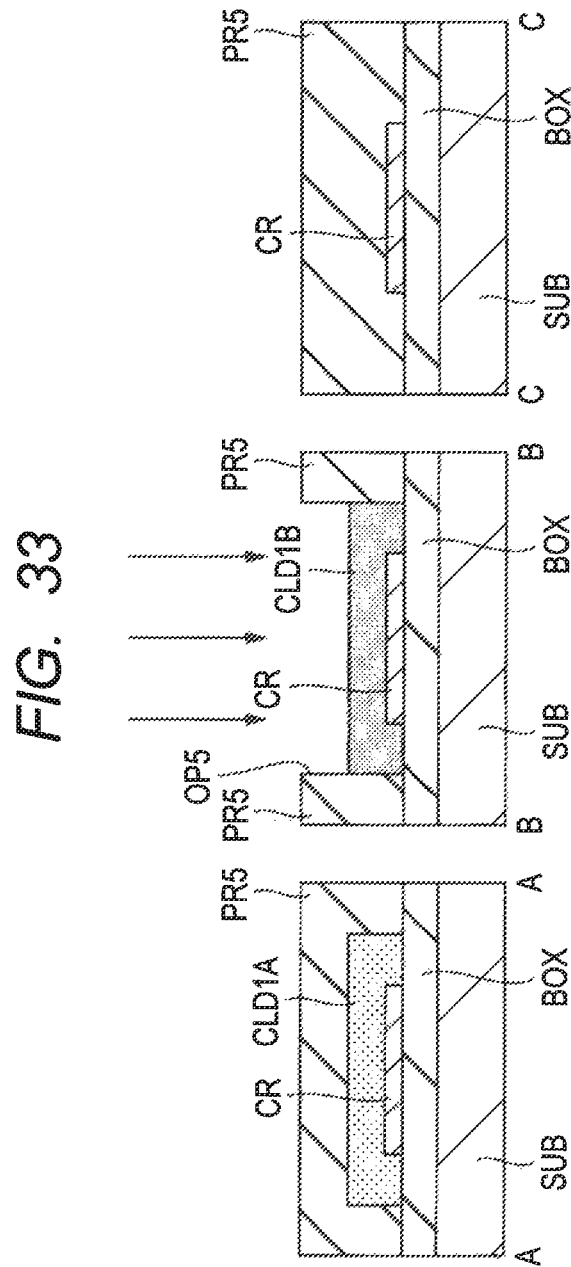
FIG. 33 is a cross-sectional view showing a manufacturing step of the semiconductor device following that of FIG. 32.

Then, as shown in FIG. 33, after application of a resist film PR5 onto the SOI substrate, an opening portion OP5 is formed in the resist film PR5 formed in the B-B cross-section (corresponding to the boundary portion P2 of the core layer CR) by photolithography. By ion implantation with the resist film PR5 having therein the opening portion OP5 with a mask, an impurity for reducing the refractive index of the clad layer CLD1A is introduced into the clad layer CLD1A exposed from the opening portion OP5 in the B-B cross-section (corresponding to the boundary portion P2 of the core layer CR) to form a clad layer CLD1B having a refractive index lower than that of the clad layer CLD1A.

Then, as shown in FIG. 34, after removal of the patterned resist film PR5, a clad layer CLD2 made of an SiOF film is formed using, for example, CVD on the SOI substrate. In such a manner, the optical waveguide of Third Embodiment is formed.

In the above embodiment, described was an example of the core layer CR comprised of the linear portion and the curved portion, but the invention is not limited to this embodiment. For example, the core layer may have a first curved portion having a finite first radius of curvature and a second curved portion having a second radius of curvature. The second radius of curvature is smaller than the first radius of curvature. The first radius of curvature and the second radius of curvature are not particularly limited. For example, the first radius of curvature is 100 μm or more and the second radius of curvature is less than 100 μm.

In the above embodiment, described was an example using a silicon oxynitride film (SiON film) for the clad layer CLD1 and a SiOF film for the clad layer CLD2, but the invention is not limited to this embodiment. For example, the clad layer CLD1 may be made of any of SiNx (Si-rich, refractive index: 2.1), SiN (refractive index: 1.99), $TiO_2$ (refractive index: 2.4 to 2.7), $HfO_2$ (refractive index: 1.85) or polyimide (refractive index: 1.5 to 1.6) and the clad layer CLD2 may be any of SiO (B-rich, refractive index: 1.44), a low refractive index resin (for example, a low refractive index resin of OF series, product of Sevensix Inc. refractive index level: 1.4), or air (refractive index: 1.0) The above refractive indices are each a value for 1.5-μm wavelength light.

The invention made by the present inventors was described specifically based on some embodiments. It is needless to say that the invention is not limited to or by those embodiments but can be changed in various ways without departing from the gist of the invention.

What is claimed is:

1. A semiconductor device, comprising:
  a core layer,
  a first clad layer having a refractive index lower than that of the core layer, and
  a second clad layer having a refractive index lower than that of the core layer and different from that of the first clad layer,
  the core layer comprising:
    a first portion contacting with the first clad layer and overlapping with the first clad layer in a plan view;
    a second portion comprising:
      a first overlapping portion contacting with the first clad layer and overlapping with the first clad layer in the plan view; and
      a second overlapping portion contacting with the second clad layer and overlapping with the second clad layer in the plan view, the second overlapping portion being adjacent to the first portion; and
    a third portion contacting with the second clad layer and overlapping with the second clad layer in the plan view, the third portion being adjacent to the second portion and having a finite radius of curvature,
  wherein, in a cross-section orthogonal to an extending direction of the second portion and passing through the second portion, a first ratio of a first contact area of an upper surface of the core layer and the first clad layer to a second contact area of the upper surface of the core layer and the second clad layer, and a second ratio of a third contact area of the upper surface of the core layer and the second clad layer to a fourth area of the core layer and the first clad layer are each a finite value more than 0,
  wherein the first ratio, in the cross-section orthogonal to the extending direction of the second portion and passing through the second portion, is lower than the first ratio in a cross-section orthogonal to an extending direction of the first portion and passing through the first portion, and is greater than the first ratio in a cross-section orthogonal to an extending direction of the third portion and passing through the third portion, and
  wherein the second ratio, in the cross-section orthogonal to the extending direction of the second portion and passing through the second portion, is greater than the second ratio in the cross-section orthogonal to an extending direction of the first portion and passing through the first portion, and is lower than the second ratio in a cross-section orthogonal to an extending direction of the third portion and passing through the third portion.

2. The semiconductor device according to claim 1, wherein the first ratio, in a first cross-section orthogonal to ti extending direction of the second portion, passing through the second portion and located on a side of the first portion, is greater than the first ratio in a second cross-section orthogonal to the extending direction of the second portion and passing through the second portion, and located on a side closer to the third portion than the first cross-section.

3. The semiconductor device according to claim 1, wherein the second ratio at a position in which each of the first clad layer and the second clad layer contacts with the core layer in a first cross-section orthogonal to the extending direction of the second portion and passing through the second portion, and located on a side of the first portion, is lower than the second ratio at a position in which each of the first clad layer and the second clad layer contacts with the core layer in a second cross-section orthogonal to the extending direction of the second portion and passing through the second portion, and located on a side closer to the third portion than the first cross-section.

4. The semiconductor device according to claim 1, wherein the first ratio decreases as going from a first cross-section orthogonal to the extending direction of the second portion and passing through the second portion, and located on a side of the first portion to a second cross-section orthogonal to the extending direction of the second portion, passing through the second portion, and located on a side closer to the third portion than the first cross-section.

5. The semiconductor device according to claim 1, wherein the second ratio increases as going from a first cross-section orthogonal to the extending direction of the second portion, passing through the second portion, and located on a side of the first portion to a second cross-section orthogonal to the extending direction of the second portion, passing through the second portion, and located on a side closer to the third portion than the first cross-section.

6. The semiconductor device according to claim 1, wherein the second portion includes a portion extending in a first direction.

7. The semiconductor device according to claim 1, wherein the second portion includes a portion extending in a first direction and a portion having a finite radius of curvature.

8. The semiconductor device according to claim 1, wherein the second portion includes a portion having a finite radius of curvature.

9. The semiconductor device according to claim 1, wherein a planar shape of the first overlapping portion includes a taper shape.

10. The semiconductor device according to claim 1, wherein a planar shape of the first overlapping portion includes a rugged shape.

11. The semiconductor device according to claim 1, wherein a planar shape of a tip portion of the first overlapping portion includes an arc shape.

12. The semiconductor device according to claim 1, wherein the first portion has a rectangular planar shape.

13. The semiconductor device according to claim 1, wherein the third portion has a planar shape same as that of a U-shaped curved portion.

14. The semiconductor device according to claim 1, wherein the second portion includes an upper surface, a first side surface crossing the upper surface, and a second side surface opposite to the first side surface, wherein the upper surface of the second portion is covered with the first clad layer and the second clad layer, wherein the first side surface of the second portion is covered with the first clad layer or the second clad layer, and wherein the second side surface of the second portion is covered with the first clad layer or the second clad layer.

15. The semiconductor device according to claim 1, wherein the semiconductor device includes a silicon on insulator (SOI) substrate, wherein the SOI substrate comprises:
a support substrate;
a buried insulating layer formed over the support substrate; and
a semiconductor layer formed over the buried insulating layer, and wherein the core layer includes the semiconductor layer.

16. The semiconductor device according to claim 15, wherein the buried insulating layer comprises:
an overlapping portion with the core layer in the plan view; and
a non-overlapping portion with the core layer in the plan view, and
wherein both a portion of the overlapping portion and a portion of the non-overlapping portion have an impurity introduced therein, for changing a refractive index of the buried insulating layer.

17. The semiconductor device according to claim 16, wherein a refractive index of a region including a portion of the overlapping portion and a portion of the non-overlapping portion of the buried insulating layer formed right below the first portion of the core layer and having a first impurity introduced therein is greater than a refractive index of a region including a portion of the overlapping portion and a portion of the non-overlapping portion of the buried insulating layer formed right below the third portion of the core layer and having a second impurity introduced therein, the second impurity being different from the first impurity.

18. The semiconductor device according to claim 15, wherein the buried insulating layer comprises:
an overlapping portion with the core layer in the plan view; and
a non-overlapping portion with the core layer in the plan view, and
wherein the overlapping portion has an impurity introduced therein for changing a refractive index of the buried insulating layer.

19. The semiconductor device according to claim 1, wherein the first clad layer comprises a SiON film, and
wherein the second clad layer comprises a SiOF film.

* * * * *